(12) United States Patent
Wu et al.

(10) Patent No.: US 8,796,234 B2
(45) Date of Patent: Aug. 5, 2014

(54) CROSSLINKING BRANCHED MOLECULE THROUGH THIOL-DISULFIDE EXCHANGE TO FORM HYDROGEL

(75) Inventors: Decheng Wu, Singapore (SG); Ye Liu, Singapore (SG); Chee Leng Lay, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/509,978

(22) PCT Filed: Nov. 24, 2009

(86) PCT No.: PCT/SG2009/000445
§ 371 (c)(1),
(2), (4) Date: May 15, 2012

(87) PCT Pub. No.: WO2011/065916
PCT Pub. Date: Jun. 3, 2011

(65) Prior Publication Data
US 2012/0232027 A1    Sep. 13, 2012

(51) Int. Cl.
*A61K 31/704* (2006.01)
*A61K 31/337* (2006.01)
*C08G 73/02* (2006.01)
*C08L 71/02* (2006.01)
*C08L 81/04* (2006.01)
*C08L 81/02* (2006.01)

(52) U.S. Cl.
CPC ............. *C08G 73/028* (2013.01); *C08L 71/02* (2013.01); *C08L 81/04* (2013.01); *C08L 81/02* (2013.01)
USPC ............................ 514/34; 514/449; 514/706

(58) Field of Classification Search
CPC ....... C08G 73/028; C08L 71/02; C08L 81/04; C08L 81/02
USPC .......................................... 514/34, 449, 706
See application file for complete search history.

(56) References Cited

U.S. PATENT DOCUMENTS

| | | | |
|---|---|---|---|
| 6,020,457 A | 2/2000 | Klimash et al. | |
| 6,451,346 B1 | 9/2002 | Shah et al. | |
| 6,514,535 B2 * | 2/2003 | Marchant | 424/486 |
| 6,630,457 B1 | 10/2003 | Aeschlimann et al. | |
| 6,841,617 B2 | 1/2005 | Jeong et al. | |
| 6,998,115 B2 | 2/2006 | Langer et al. | |
| 7,052,711 B2 | 5/2006 | West et al. | |
| 7,087,244 B2 | 8/2006 | Jeong et al. | |
| 7,196,180 B2 | 3/2007 | Aeschlimann et al. | |
| 7,309,757 B2 | 12/2007 | Liu et al. | |
| 2003/0099709 A1 | 5/2003 | Shah et al. | |
| 2004/0228794 A1 | 11/2004 | Weller et al. | |
| 2005/0143484 A1 | 6/2005 | Fang et al. | |
| 2006/0153795 A1 | 7/2006 | West et al. | |
| 2007/0149441 A1 | 6/2007 | Aeschlimann et al. | |
| 2007/0244259 A1 | 10/2007 | Lee et al. | |
| 2007/0265356 A1 | 11/2007 | Kim et al. | |
| 2008/0095736 A1 | 4/2008 | Pathak et al. | |
| 2008/0187568 A1 | 8/2008 | Sawhney | |
| 2008/0260802 A1 | 10/2008 | Sawhney et al. | |
| 2008/0293827 A1 | 11/2008 | Lee et al. | |
| 2009/0123544 A1 | 5/2009 | Liu et al. | |

FOREIGN PATENT DOCUMENTS

| | | |
|---|---|---|
| EP | 1115433 | 7/2001 |
| WO | 0016818 | 3/2000 |
| WO | 0217880 | 3/2002 |
| WO | 0226215 | 4/2002 |
| WO | 03087196 | 10/2003 |
| WO | 2005073281 | 8/2005 |
| WO | 2005079757 | 9/2005 |
| WO | 2006109945 | 10/2006 |
| WO | 2006118547 | 11/2006 |
| WO | 2007117222 | 10/2007 |
| WO | 2008097581 | 8/2008 |
| WO | 2011065916 | 6/2011 |

OTHER PUBLICATIONS

Fernandes et al. Theoretical Insights into the Mechanism for ThioVDisullide Exchange. Chem Eur J 10:257-266, 2004.*
Kurtoglu et al., Poly(amidoamine) dendrimer—drug conjugates with disulfide linkages for intracellular drug delivery, J. Biomaterials, Apr. 2009, pp. 2112-2121, vol. 30.
Meng et al., Reduction-sensitive polymers and bioconjugates for biomedical applications, J. Biomaterials, Apr. 2009, pp. 2180-2198, vol. 30.

(Continued)

*Primary Examiner* — Brandon Fetterolf
*Assistant Examiner* — Yih-Horng Shiao
(74) *Attorney, Agent, or Firm* — Wolf, Greenfield & Sacks, P.C.

(57) ABSTRACT

In a process for forming a hydrogel, a precursor crosslinkable through disulfide bonds for forming the hydrogel is provided in a solution. The precursor comprises a branched molecular structure, which comprises a plurality of branches. At least three of the branches each comprises a disulfide bond. The pH in the solution is adjusted to initiate thiol-disulfide exchange in the precursor, thus crosslinking the precursor through disulfide bonds formed by thiol-disulfide exchange. After the precursor is sufficiently crosslinked to form a hydrogel, the pH in the solution is adjusted to inhibit further thiol-disulfide exchange in the hydrogel. Further, a hydrogel matrix may comprise a polymer substantially crosslinked through disulfide bonds. The polymer may comprise a hydrophobic poly (amido amine) core and an amino-functionalized hydrophilic shell.

24 Claims, 16 Drawing Sheets

(56) References Cited

OTHER PUBLICATIONS

Shu et al., Disulfide Cross-Linked Hyaluronan Hydrogels, J. Biomacromolecules, 2002, pp. 1304-1311, vol. 3.

Jikei et al., Hyperbranched polymers: a promising new class of materials, Progress in Polymer Science, May 2001, pp. 1233-1285, vol. 26.

Guan et al., Chain walking: a new strategy to control polymer topology, Science, Mar. 1999, pp. 2059-2062, vol. 283.

International Search Report, mailed Jan. 20, 2010, in PCT Application No. PCT/SG2009/000445.

Flory, P. J., Constitution of Three-Dimensional Polymers and the Theory of Gelation, J. Phys. Chem., 1942, pp. 132-140, vol. 46.

Flory, P. J., Fundamental Principles of Condensation Polymerization, Chemistry Review, 1946, pp. 137-197, vol. 39.

Lin et al., Linear poly(amido amine)s with secondary and tertiary amino groups and variable amounts of disulfide linkages: Synthesis and in vitro gene transfer properties, J. Controlled Release, Nov. 2006, pp. 130-137, vol. 116.

Umali et al., Thiol-disulfide exchange yields multivalent dendrimers of melamine, Organic Letters, Apr. 2003, pp. 1245-1247, vol. 5(8).

Tao et al., RAFT synthesis and DNA binding of biodegradeable, hyperbranched poly(2-(dimethylamino)ethyl methacrylate, Macromolecules, Jun. 2009, pp. 4260-4962, vol. 42.

Martello et al., Hyperbranched poly(amidoamine)s containing disulfide linkages in the main chain to DNA transfection, Journal of Controlled Release, 2008, pp. e10-e12, vol. 132.

Written Opinion of the International Searching Authority, mailed Jan. 20, 2010, in PCT Application No. PCT/SG2009/000445.

International Preliminary Report on Patentability, dated Jan. 19, 2011, in PCT Application No. PCT/SG2009/000445.

\* cited by examiner

CROSSLINKING BRANCHED MOLECULE THROUGH THIOL-DISULFIDE EXCHANGE TO FORM HYDROGEL

RELATED APPLICATIONS

This application is a U.S. National Stage application under §371 of International Application No. PCT/SG2009/000445, filed Nov. 24, 2009, the contents of which is incorporated herein by reference in its entirety.

FIELD OF THE INVENTION

The present invention relates to generally the formation of hydrogels, and more particularly to forming hydrogels from branched molecules.

BACKGROUND OF THE INVENTION

Hydrogels, such as biodegradable hydrogels, are useful in many applications including biomedical and pharmaceutical applications. Typically, a hydrogel is formed of a three-dimensional (3D) network (matrix) of a hydrophilic polymeric material, which can swell in water and hold a significant amount of water while maintaining its general network structure. The network structure may be linked together through chemical or physical links. A 3D network can be formed by crosslinking hydrophilic polymers via covalent bonds, hydrogen bonding, van der Waals interactions, or physical entanglement. Hydrogels have been prepared in situ using various methods. For instance, gelation of the precursor solution may be initiated using a chemical initiator, light, or heat. However, each existing technique for preparation of hydrogels suffers some shortcomings. For example, hydrogels prepared by some techniques are not biodegradable, which limits their application; some techniques are difficult or impossible to apply in situ; some techniques involve a complicated gel process in which it is difficult to control the formation process and the properties of the resulting hydrogel.

SUMMARY OF THE INVENTION

In accordance with an aspect of the present invention, there is provided a process for forming a hydrogel. In the process, a precursor crosslinkable through disulfide bonds for forming the hydrogel is provided in a solution. The precursor comprises a branched molecular structure, which comprises a plurality of branches. At least three of the branches each comprises a disulfide bond. The pH in the solution is adjusted to initiate thiol-disulfide exchange in the precursor, thus crosslinking the precursor through disulfide bonds formed by thiol-disulfide exchange. After the precursor is sufficiently crosslinked to form a hydrogel, the pH in the solution is adjusted to inhibit further thiol-disulfide exchange in the hydrogel. The pH in the solution may be increased to above about 12 to initiate thiol-disulfide exchange in the precursor, and may be decreased to below about 8 to inhibit further thiol-disulfide exchange in the hydrogel. The solution may be at a temperature from about −20° C. to about 150° C. The solution may comprise about 0.1 to about 40 wt % of the precursor. The pH in the solution may be adjusted by adding a base or acid to the solution. The thiol-disulfide exchange in the precursor may be allowed to occur for about one minute to about three days. The pH in the solution may be adjusted to inhibit further thiol-disulfide exchange at a time selected to control a degree of crosslinking in the hydrogel. The branched molecular structure may comprise a segment that comprises three or four branches branching from a single branching group, each of the three or four branches comprising a disulfide bond. The branching group may comprise a carbon, silicon, phosphorus, amine, amonium cation, imine group, methine group, amide group, or phosphite group. At least one of the plurality of branches in the branched molecular structure may comprise a plurality of linearly linked disulfide bonds. The branched molecular structure may comprise a plurality of branching points each comprising a branching group bonded to at least three branches. The precursor may be a hyperbranched polymer. The precursor may comprise poly(amido amine). The precursor may comprise N-substituted poly(ethylene glycol) groups and vinyl groups. The molar ratio of vinyl groups to N-substituted poly(ethylene glycol) groups in the precursor may be from about 1:1.1 to about 1:4. The branched molecular structure may have a molecular weight from about 500 g/mol to about 600,000 g/mol. The branched molecular structure may comprise a hydrophobic poly(amido amine) core and an amino-functionalized hydrophilic shell. The solution may comprise a releasable agent so that the releasable agent is in the hydrogel when the hydrogel is formed. The releasable agent may be a bioactive agent. The precursor may comprise differently structured branched molecules, the differently structured branched molecules being crosslinkable to one another through disulfide bonds. A disulfide bond formed by the thiol-disulfide exchange may link branches of a single molecule of the precursor. A disulfide bond formed by the thiol-disulfide exchange may links branches of different molecules of the precursor. Each one of the plurality of branches in the branched molecular structure may comprise a disulfide bond.

In accordance with another aspect of the present invention, there is also provided a hydrogel matrix comprising a polymer substantially crosslinked through disulfide bonds, the polymer comprising a hydrophobic poly(amido amine) core and an amino-functionalized hydrophilic shell. The amino-functionalized hydrophilic shell may comprise amino-terminated poly(ethylene glycol).

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION

Figure 1:
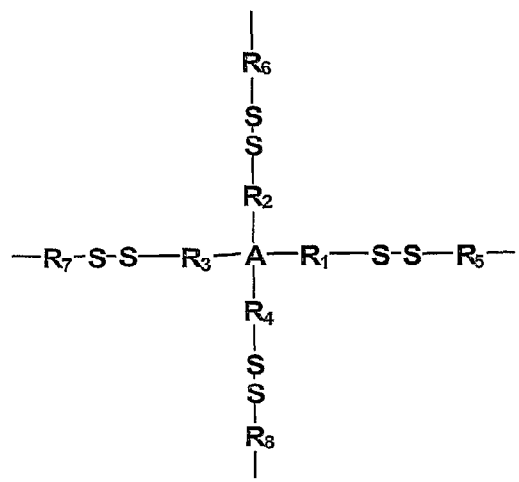
FIG. 1 is a schematic representation of an exemplary branching segment with four branches bonded to one branching group and containing disulfide bonds.

According to an exemplary embodiment of the present invention, a biodegradable hydrogel may be conveniently formed in situ from a precursor crosslinkable through disulfide bonds, where the precursor includes branched molecules that have a branched molecular structure and at least three of the branches in the branched molecular structure each have a disulfide bond. The hydrogel is formed in a controlled thiol-disulfide exchange process, where the precursor is crosslinked through disulfide bonds formed in thiol-disulfide exchange reactions. The thiol-disulfide exchange process, and hence the degree of crosslinking in the hydrogel, is conveniently controlled by adjusting the pH in the reaction solution.

The branched molecules of the precursor may be of any suitable type. For example, a branched molecule may be a dendrimer (dendron), a dendronised polymer, a hyperbranched polymer, or the like. The branched molecule may also include a graft polymer, a star polymer, a comb polymer, or a brush polymer. A hyperbranched polymer is dendritic in the sense that it has a structure similar to a dendrimer but with a reduced degree of branching as compared to a dendrimer. The degree of branching in a branched molecule may be determined based on the process for preparing the branched molecule, based on a structural analysis of the molecule, or from the ratio of hydrodynamic radius ($R_h$) to radius of gyration ($R_g$). For example, a hyperbranched polymer prepared from a monomer having an $AB_2$ structure may have an $R_g/R_h$ ratio of about 1.079. See e.g., M. Jikei et al., "Hyperbranched polymers: a promising new class of materials," Prog. Polym. Sci., 2001, vol. 26, p. 1233-1285; and Z. Guan et al., "Chain Walking: A New Strategy to Control Polymer Topology", *Science*, 1999, vol. 283, p. 2059.

The branched molecule may have one or more branching points. Three or more branches are bonded to a branching group at each branching point. The branching group may be formed of any suitable functional group. For example, the branching group may be a carbon (C), silicon (Si), phosphorus (P), amine (N), amonium cation ($N^+$), imine group, methine group, amide group, or phosphite group, depending on the number branches that are linked to the same branching group. When a list of items is given herein with an "or" before the last item, as in the preceding sentence, any of the listed items or any suitable combination of the listed items may be selected and used. The branching group may include a plurality of functional groups bonded to one another. For instance, the branching group may include an imine group bonded to an amine.

At least three branches are linked to the branching group at each branching point. A sufficient number of the branches in the branched molecules include disulfide bonds, also referred to as disulfide linkages or disulfide bridges. As can be understood, a disulfide linkage includes a pair of bonded sulfur atoms, represented as $R_a$—S—S—$R_b$, wherein $R_a$ and $R_b$ may be same or different. $R_a$ and $R_b$ may independently be a terminal group or a group that is linked to another part of the molecule, be linear or branched, and may include further disulfide bonds.

The thiolate group, $S^-$, carries a −1 charge and tends to form a covalent bond with another thiolate group to form a disulfide group, which may be expressed as $S_2^{2-}$. In a suitable condition, such as in a solution with a suitable pH value and a suitable temperature, a nearby thiolate group can attack one of the sulfur atoms in a disulfide bond, thus breaking the original disulfide bond, forming a new disulfide bond, and releasing the other sulfur atom in the original disulfide bond as a new thiolate group. The new thiolate group can now attack another disulfide bond nearby. This reaction is known as thiol-disulfide exchange, which in a sense can relocate the disulfide bonds in the molecule or between different molecules. The attacking thiolate groups may be formed by breaking disulfide bonds, or by deprotonating thiol groups at high pH. The initial attacking thiolate groups may also be formed from thiol groups in other molecules or materials present in the solution with a high pH.

The thiol-disulfide exchange can be conveniently utilized to crosslink the precursor to form a network of crosslinked polymer matrix, which may form a hydrogel.

In the present embodiment, the precursor has sufficient disulfide bonds when the number of disulfide bonds in the branched molecular structure(s) is high enough to allow the branched molecules to be crosslinked through thiol-disulfide exchange to form a hydrogel. For example, in some embodiments, each branch of a precursor molecule may have a disulfide bond. However, it is not necessary that each branch of the branched molecular structure has a disulfide bond. As can be understood by a person skilled in the art, for a given branched molecular structure, the minimum proportion of the branches in the precursor molecule that need to include a disulfide bond may vary depending on the degree of crosslinking that is required to form the desired hydrogel. Generally, the higher the degree of crosslinking required, the higher the proportion of the branches that need to include disulfide bonds. The required degree of crosslinking for forming hydrogel from a particular precursor can be readily accessed or determined by those skilled in the art, such as based on the molecular structure of the precursor and known test data.

The precursor may be selected based on known theories and techniques of gelation and hydrogel formation, including those based on the Flory's theory disclosed in Flory, P. J., *Principles of Polymer Chemistry*, Chapter 9, Cornell University Press: Ithaca, N.Y., 1953, Flory. P. J., "Constitution of Three-dimensional Polymers and the Theory of Gelation," *J. Phys. Chem.*, 1942, vol. 46, pp. 132-140; and Flory. P. J., "Fundamental Principles of Condensation Polymerization,"

*Chem. Rev.*, 1946, vol. 39, pp. 137-197 (hereinafter "Flory"). Using the terminology of Flory, gelation may occur during polymerization of multi-functional monomer units when monomer conversions surpass the gel point, which can be predicted theoretically on the basis of the chemistries and compositions of the input monomer units. For example, Flory discloses how to determine the critical value of $\alpha$ at which gelation becomes possible for different multi-functional branching units, where $\alpha$ is the branching coefficient (see e.g. pp. 180-195 of Flory). For instance, a branched molecular structure containing three branches each having a disulfide bond can be regarded as a tri-functional monomer unit, which may be denoted as $A_3$, $A=$—SS—. The branched structure $A_3$ may be activated, through thiol-disulfide exchange reaction, to unit structures of the form of $A_2B$, $AB_2$, or $B_3$, where $B=$—$S^-$. Further reaction between various monomer structures such as $A_3+AB_2$, $A_3+B_3$, or generally $A_m+B_n$ (m, n$>=$3), can form a three-dimensional network structure (matrix). In this matrix, three or more monomer units may form a ring structure where each side of the ring structure includes a disulfide bond formed through disulfide exchange. Different ring structures in the matrix can also be linked by disulfide bonds formed in disulfide exchange. See, for example, FIG. 17. When the polymeric material in the matrix has sufficient hydrophilicity to prevent aggregation, the three-dimension network can form a hydrogel that can absorb water into the polymeric matrix.

Without being limited to any particular theory, it is expected that, while thiol-disulfide exchange may occur within a non-terminal segment of a molecule and a terminal segment of the molecule, as more crosslinks are formed in the precursor (either between different molecules or within individual molecules), the non-terminal segments of the crosslinked molecule (or network) become increasingly less accessible to the attacking thiolate groups than the terminal segments at the peripheral of the crosslinked molecule. As a result, the crosslinked molecules are more likely to be further crosslinked through the relocation of the disulfide bonds in the branches, and are less likely to be broken apart due to the breaking of disulfide bonds in the non-terminal segments, such as in the crosslinking segments.

By contrast, if a polymer is to be formed from branched monomer units where only two of the branches in each branch unit contain disulfide bonds, or from linear monomer units, it will not have a three-dimensional network of monomer units crosslinked by disulfide bonds formed in disulfide exchange. In this case, the monomer units can only form linear, chain, or isolated ring structures through disulfide exchange.

Figure 2:
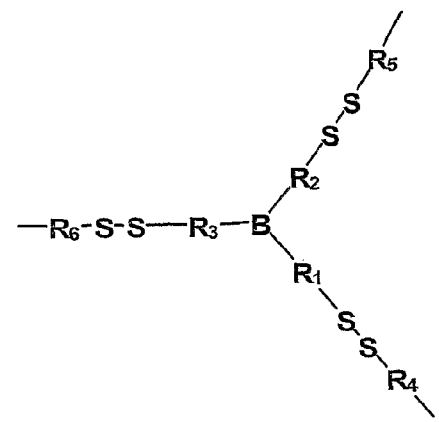
FIG. 2 is a schematic representation of an exemplary branching segment with three branches bonded to one branching group and containing disulfide bonds.
Figure 3:
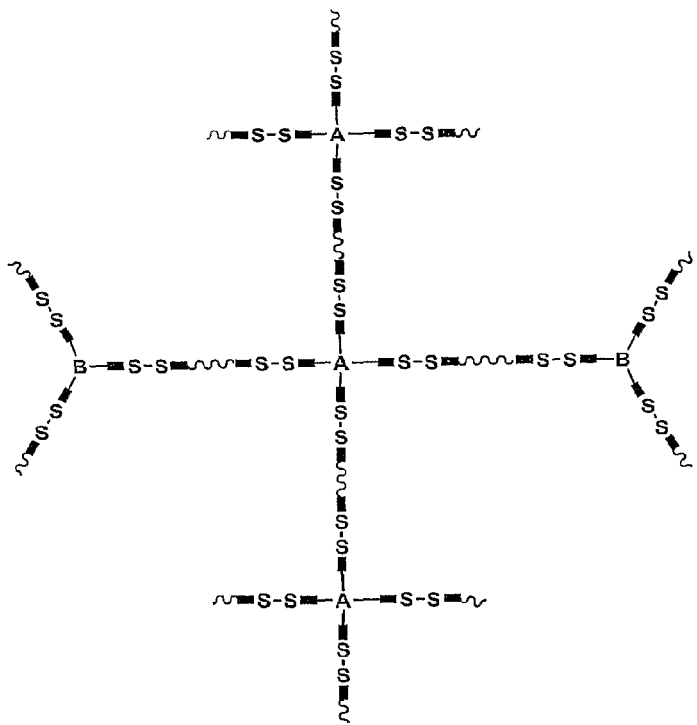
FIG. 3 is a schematic representation of an exemplary hyperbranched polymer containing disulfide bonds.

In exemplary embodiments of the present invention, the branched molecule may include one or more of the exemplary segments shown in FIGS. 1 and 2, and may have a structure illustrated in FIG. 3. Possible segments with different exemplary branching groups are also shown in FIG. 4, For simplicity, the angles between different bonds are not accurately represented in FIGS. 1 to 4, but it should be understood the actual angles are not necessarily as depicted in the drawings.

In the figures, $R_1$, $R_2$, $R_3$, $R_4$, $R_5$, $R_6$, $R_7$, and $R_8$ may independently include any suitable substructure, as will be further illustrated below. For example, each of $R_1$-$R_8$ may be, independently, a $C_{1-300}$ alkylene, $C_{2-300}$ alkenylene, or $C_{2-300}$ alkynylene, where each of the alkylene, alkenylene and alkynylene may be unsubstituted or substituted and may optionally contain one or more heteroatoms such as N, O or S.

Figure 4:
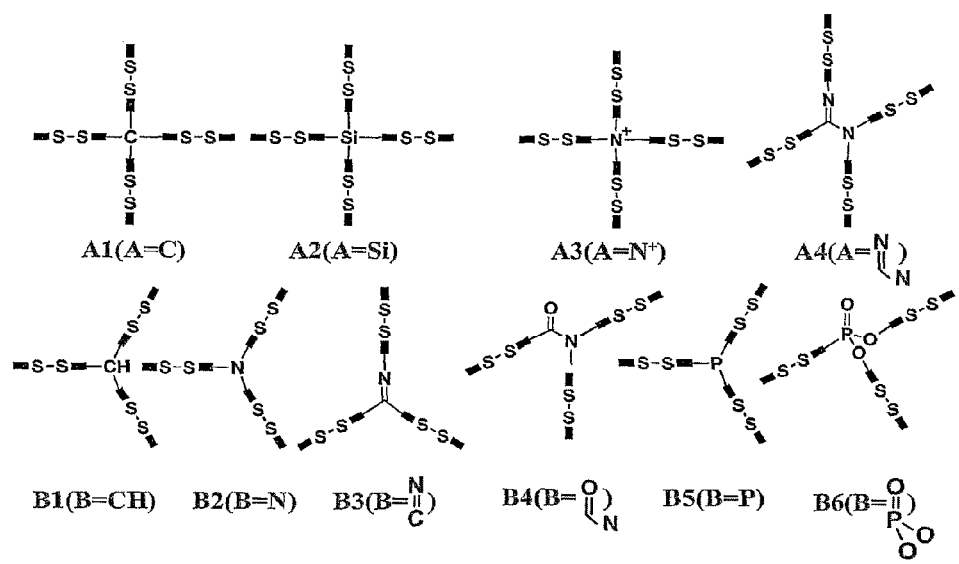
FIG. 4 are schematic representations of the exemplary branching segments shown in FIGS. 1 to 3, with different branching groups.

As illustrated in FIGS. 1, 3 and 4, four disulfide linkages may branch from a single branching point, where the branching group at the branching point may be C, Si, $N^+$(quarternary amonium cation), or a group formed by an imine group bonded to an amine.

As illustrated in FIGS. 2, 3 and 4, three disulfide linkages may branch from a single branching point, where the branching group at the branching point may be phosphorus (P), amine, methine group, imine group, amide group, or phosphite group.

One or more branches in the molecule may have a plurality of disulfide bonds linearly linked. For example, a disulfide linkage in the molecule may be linearly linked to another disulfide linkage, as illustrated in FIG. 3. The molecule may have a plurality of branching points, each of which has a branching group bonded to a plurality of branches, as illustrated in FIG. 3 (also see FIG. 5). The molecule may contain both types of branched segments shown in FIGS. 1 and 2, as illustrated in FIG. 3.

The branched molecule may include a pH-responsive hyperbranched biodegradable poly(amido amine) inner group, or core, which has at least two biodegradable disulfide bonds and at least one tertiary amine linkage. The hyperbranched poly(amido amine) materials described in U.S. Pat. No. 7,309,757 Liu et al. may be used as, or modified to prepare, the core material. The core may include various segments, such as those shown in FIGS. 1 to 5. Hyperbranched segments may be linked to a polymer backbone through one or more tertiary amine linkages (see B2 in FIG. 4). The terminal groups of the polymer precursor may include a number of vinyl groups, which can react with groups containing either secondary amino group or primary amino group to form the hyperbranched polymer.

The branched molecules. may have a molecular weight of between about 500 g/mol and about 600,000 g/mol.

To form the hydrogel, the precursor may be dispersed or dissolved in a solution. The solvent in the solution may be water, methanol, ethanol, 2-propanol, 1-butanol, dimethylsulfoxide (DMSO), dimethylformamide (DMF), dimethylacetamide (DMA), chloroform, dichloromethane, methyl chloride, tetrahydrofuran, toluene, benzene, or carbon tetrachloride.

The concentration of the precursor in the solution may vary, such as from about 0.1 wt % to about 40 wt %.

The precursor may include differently structured branched molecules, as it is possible to crosslink two or more differently structured branched molecules, such as different branched polymers, to form a hydrogel.

The precursor may be selected so that the branches of a single branched molecule can be crosslinked through disulfide bonds, or the branches of different branched molecules can be crosslinked through disulfide bonds.

The solution may have a suitable temperature, such as from about −20° C. to about 150° C.

To start the gel process, the pH of the solution is increased to above a threshold, such as above about 12, to initiate thiol-disulfide exchange between disulfide bonds of different branches of the branched molecule, and to link different branches through newly formed disulfide bonds, thus crosslinking the branched molecule to form a hydrogel. Crosslinks through disulfide bonds can be formed between different branches in individual molecules and between branches of different molecules.

The pH of the solution may be adjusted using any suitable technique. For example, a base, such as sodium hydroxide (NaOH), may be added to the solution to increase the pH value. Other bases, such as potassium hydroxide, triethylene amine, sodium alkoxide, potassium alkoxide, or the like may also be used. The concentration of the base solution may vary. In one embodiment, a solution containing 5M of NaOH may be used.

When a desired degree of crosslinking in the hydrogel has been reached, the pH of the reaction solution is lowered to below a threshold, such as below about 12 or about 8, to limit further crosslinking through thiol-disulfide exchange. For example, an acid such as hydrochloride (HCl) may be added to the solution to decrease the pH value. Other acids, such as sulfuric acid, nitric acid, carboxylic acid, or the like, may also be used. The acid solution to be added may contain 5M HCl.

Without being limited to any particular theory, it is expected that the thiolate group is more likely to be protonated to form a thiol group (—SH) in a solution with a lower pH, and, unlike the thiolate group, the thiol group will be unable to attack the disulfide bonds.

Termination of crosslinking may be effected after a predetermined time, such as from about 1 minute to about 3 days, or after visual confirmation that a hydrogel with a desired softness or compactness has formed.

The solution may also be neutralized to a pH of about 7 after crosslinking. The resulting hydrogel can remain stable in a neutral or weakly acidic solution for more than six months.

Conveniently, the gelation process and the degree of crosslinking in the resulting hydrogel can be controlled by adjusting the pH of the solution. The degree of crosslinking may be affected by both the pH value of the solution during gelation and the gelation time (i.e., the time during which the solution is at a high pH). Thus, certain properties, such as mechanical strength and the compactness, of the resulting hydrogel may be conveniently controlled by controlling the gelation process and the extent of crosslinking through pH adjustment.

As a result, the gel process may be conveniently controlled, and, in some applications, initiated without using a chemical initiator or other initiation techniques such as using light or heat.

The polymer matrix of the resulting hydrogel is substantially crosslinked through disulfide bonds formed in the thiol-disulfide exchange reactions. In some embodiments, all of the crosslinks in the hydrogel may be formed through disulfide bonds.

In the hydrogel, two branches of a single precursor molecule may be linked to one another by a disulfide bond formed in the disulfide exchange reaction. Two branches of two different precursor molecules may be linked to one another by a disulfide bond formed in the disulfide exchange reaction.

As at least a substantial portion of the crosslinks in the hydrogel is through disulfide bonds, the hydrogel is readily degradable in a bio-environment as disulfide bonds can be broken in various bio-environments, such as due to enzyme attack. As disulfide bonds are biocompatible, the hydrogel can be formed from materials that are biocompatible.

While disulfide bonds may be formed through oxidation/reduction reactions, such as by introducing into the reaction solution a foreign oxidation/reduction agent to trigger the oxidation/reduction reaction. Thiol-disulfide exchange reactions can proceed much faster than such oxidation/reduction reactions. Thus, the gelation time can be much shorter when the precursor is crosslinked to form a hydrogel through thiol-disulfide exchange, as compared to crosslinking through oxidation/reduction reactions. The hydrogel may be formed through thiol-disulfide exchange within minutes or tens of minutes, depending on the concentration of the precursor in the precursor solution. For example, in some embodiments, a hydrogel may form after about 5 minutes of crosslinking in a solution with about 30 wt % of the precursor, or after about 30 minutes in a solution with about 10 wt % of the precursor. By contrast, formation of the hydrogel through oxidation/reduction reactions may require hours or days of crosslinking. Further, some reagents and products of the oxidation/reduction reaction may be cytotoxic, or otherwise non-biocompatible, and residues of such reagents and products may also be present in the formed hydrogel.

It is therefore convenient to form a hydrogel in situ with crosslinking by thiol-disulfide exchange, and the hydrogel prepared according an embodiment of the present invention may have low cytotoxicity, depending on the materials used.

An agent, such as a releasable agent, may be incorporated into the precursor, and thus into the resulting hydrogel. For example, when a branched polymer having an amphiphilic dendritic core-shell structure is used, small agents, such as dyes, quantum dots, or noble metals, can be incorporated or encapsulated in the core region of the polymer, as can be understood by those skilled in the art.

The agent may also be mixed with the polymer in the solution before gelation to incorporate the agent into the resulting hydrogel.

For instance, a releasable agent may be encapsulated in the hydrogel, which may be formed in situ, and may be released from the hydrogel when the hyrogel is degraded either over time or by triggering a reaction that will break down disulfide bonds in the crosslinks.

A bioactive (biologically active) agent may be dispersed within the hydrogel matrix. Release of such a bioactive agent from the hydrogel may be conveniently controlled, such as by adjusting the degree of crosslinking in the polymer or by controlled degradation of the hydrogel. The resulting hydrogel may be used as a smart vector for delivering the bioactive agent, such as drug, protein or DNA, to a cell, and smart scaffold for tissue engineering.

In an exemplary embodiment, the precursor may be an amphiphilic hyperbranched biodegradable polymer, which includes a pH-sensitive hydrophobic poly(amido amine) inner group (core) and a hydrophilic poly(alkylene oxide) peripheral group (shell). As used herein, a core may refer to an inner part of the molecule and a shell may refer to a peripheral part of the molecule. The core and shell may be formed in a single molecule. For example, a dendrimer or a micelle molecule may be considered to have a core-shell structure. The core and shell may also be formed from different molecules. For example, gold nanoparticles (AuNP) with poly(ethylene glycol) (PEG)-monoamine (PEG-NH$_2$) affixed to the particle surface through disulfide anchors may be considered to have a structure with AuNP core and PEG Shell.

The core of the polymer may have at least one tertiary amine linkage and at least three disulfide linkages.

In an embodiment, the precursor for the polymer core may be prepared utilizing the Michael addition reaction. For example, an amino functionalized hydrophilic group, such as an amino-terminated PEG may be added to a terminal vinyl group in a hyperbranched poly(amido amine) precursor. In particular, a bisacrylamide monomer containing at lease one disulfide linkage may be reacted with a diamine monomer, wherein the diamine monomer has one primary amino group and one secondary amino group, to form a vinyl-terminated hyperbranched poly(amido amine).

The diamine monomer has one secondary amino group and one primary amino group, but may optionally have one or more tertiary amino groups. The diamine monomer may have no tertiary amino group. Suitable diamine monomers include 1-(2-aminoethyl)piperazine, N-methyl ethylenediamine, 4-(aminomethyl)piperidine, 4-amino-piperidine, 3-aminopyrrolidine, N-ethylethylenediamine, N-methyl-1,3-propanediamine, N-isopropylethylenediamine, N-hexylethylenediamine, N-butylethylenediamine, N-(2-hydroxypropyl) ethylenediamine, and N, N-diethyldi-ethylene triamine.

A suitable bisacrylamide monomer may include N,N'-bis (acryloyl)cystamine.

Michael addition polymerization may carried out by adopting and modifying suitable techniques disclosed in the literature, e.g., including those disclosed in U.S. Pat. No. 6,998,115 to langer et al.; Y. B. Lim et al., *J. Am. Chem. Soc.* 2001, vol. 123, p. 2460; A. Akinc et al., *J. Am. Chem. Soc.* 2003, vol. 125, p. 5316; and C. Lin et al., *J. Control. Release.*, 2006, vol. 116, p. 130; US 7,309,757 to Liu et al.; WO 2006/118547 to Liu et al.; D. C. Wu et al., *Macromolecules,* 2004, vol. 37, p. 6763; D. C. Wu, et al., *Macromolecules,* 2005, vol. 38, p. 5519; D. C. Wu et al., *Biomacromolecules,* 2005, vol. 6, p. 3166.

Figure 5:
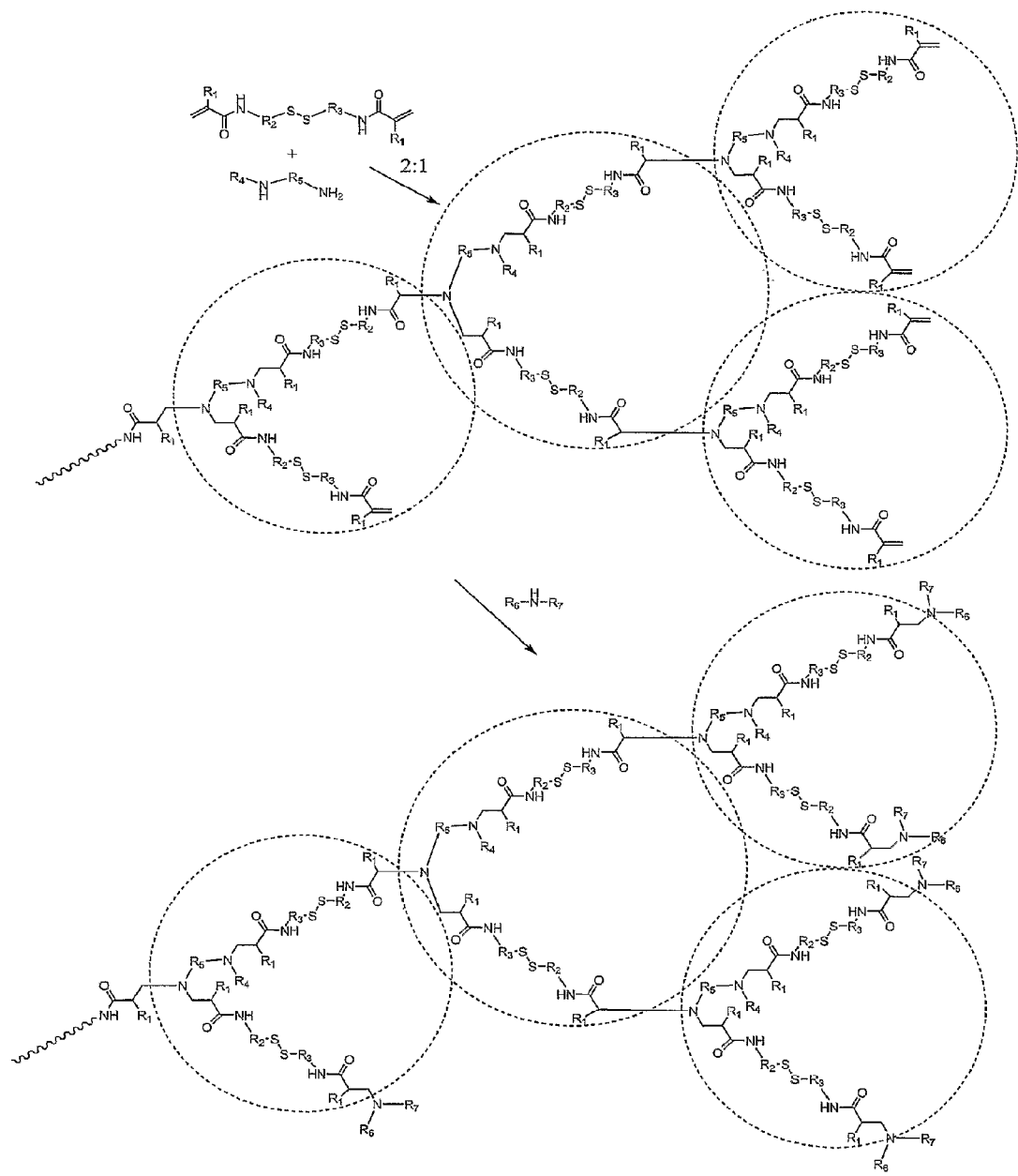
FIG. 5 is a schematic representation of an exemplary process for forming an exemplary hyperbranched polymer.

As illustrated at the bottom portion in FIG. 5, the polymer may include a poly(amido amine) with terminal vinyl groups and N-substituted poly(ethylene glycol) capping groups. The molar ratio of vinyl groups to N-substituted poly(ethylene glycol) groups in the polymer may be about 1:1.1 to about 1:4.

In FIG. 5 and elsewhere herein, $R_1$ may be hydrogen, hydroxyl, halide, thiohydroxyl, or hydrocarbyl.

$R_2$ and $R_3$ may be unsubstituted or substituted $C_{1-30}$ alkylene; unsubstituted or substituted $C_{2-30}$ alkenylene; or unsubstituted or substituted $C_{2-30}$ alkynylene. In some applications, $R_2$ or $R_3$ may be an unsubstituted or substituted $C_{2-6}$ alkylene, and may be ethylene, propylene, or butylene.

$R_5$ may be (i) unsubstituted or substituted $C_{1-30}$ alkylene; unsubstituted or substituted $C_{2-30}$ alkenylene; or unsubstituted or substituted $C_{2-30}$ alkynylene; or (ii) —R'-M-R"—. R is bonded to —N($R_4$)— and is unsubstituted or substituted $C_{1-6}$ alkylene, or unsubstituted or substituted $C_{2-6}$ alkenylene. M is CH or N. R" is unsubstituted or substituted $C_{1-28}$ alkylene; unsubstituted or substituted $C_{2-28}$ alkenylene; or unsubstituted or substituted $C_{2-28}$ alkynylene. In one embodiment, $R_5$ may be a $C_{1-6}$ alkylene.

$R_4$ is hydrocarbyl, or, when $R_5$ is —R'-M-R"—, $R_4$ is bonded to M and is unsubstituted or substituted $C_{1-6}$ alkylene, or unsubstituted or substituted $C_{2-6}$ alkenylene. In the latter case, $R_4$, M, R' a and the nitrogen atom to which $R_4$ and R" are bonded form a saturated or unsaturated four- to twelve-membered heterocyclic ring. In some embodiments, $R_4$ may be ethylene, propylene, isopropylene, 2-hydroxypropylene, 3-hydroxypropylene, butylene, hexylene, or N, N-diethylamino ethylene.

Figure 6:
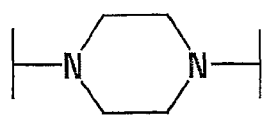
FIGS. 6, 7, 8, 9, and 10 are schematics of different chemical structures.

In some applications, $R_5$ may be —R'-M-R"—, R" may be ethylene, and $R_4$, M, R' and the nitrogen atom to which $R_4$ and R' may be bonded to form a group as shown in FIG. 6.

Figure 7:
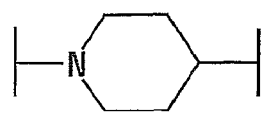

In some other applications, R" may be methylene, and $R_4$, M, R' and the nitrogen atom to which $R_4$ and R' may be bonded to form a group as shown in FIG. 7.

$R_7$ is (i) unsubstituted or substituted $C_{1-30}$ alkylene; unsubstituted or substituted $C_{2-30}$ alkenylene; or unsubstituted or substituted $C_{2-30}$ alkynylene; (ii) —R'-M-R"—, where R is bonded to —N($R_6$)—; or (iii) an oligo-monomer. The oligo-monomer may be poly(ethylene glycol), poly(propylene glycol), poly(N-isopropylacrylamide), poly(L-lactic acid), poly (acrylic acid), polyacrylamide, poly(glycolic acid), poly(2-hydroxyethyl methacrylate), poly(vinyl alcohols), poly (sodium 4-styrenesulfonate), polycaprolactone, chitosan, or cellulose.

$R_6$ may be hydrocarbyl, or, when $R_7$ is —R'-M-R"—, $R_6$ may be bonded to M and may be unsubstituted or substituted $C_{1-6}$ alkylene, or unsubstituted or substituted $C_{2-6}$ alkenylene. In the latter case, $R_6$, M, R and the nitrogen atom to which $R_6$ and R" are bonded form a saturated or unsaturated four-to twelve-membered heterocyclic ring. $R_6$ may be hydrogen, methyl, or carboxyl.

Each of $R_1$, $R_2$, $R_3$, $R_4$ $R_5$, $R_6$ and $R_7$ is free of primary amino group, secondary amino group, and C=C double bond conjugated with a carbonyl group. At least one of $R_2$, $R_3$, $R_5$, $R_6$, $R_7$, R', and R" may optionally include one or more heteroatoms, such as N, O and S.

Hydrocarbyl refers to a hydrocarbon radical that may contain one or more heteroatoms and may include branched and unbranched alkyl, branched and unbranched alkenyl, branched and unbranched alkynyl, aryl, alkoxyl, carbamoyl, carboxyl ester, carbonyldioxyl, amide, alkylthioether, dialkylamino, trialkylamino, cyano, ureido, a substituted alkanoyl group, cyclic, cyclic aromatic, heterocyclic, and aromatic heterocyclic groups. Each of the above listed groups may be substituted with one or more substituents, which include branched or unbranched alkyl, branched or unbranched alkenyl, branched or unbranched alkynyl, dialkylamino, trialkylamino, aryl, ureido, heterocyclic, aromatic heterocyclic, cyclic, aromatic cyclic, halogen, hydroxyl, alkoxy, cyano, amide, carbamoyl, carboxylic acid, ester, carbonyl, carbonyldioxyl, alkylthioether, and thiol groups. Hydrocarbyl may include hydrocarbon radicals that are linked to the branched molecule compound via a heteroatom, for example, an alkoxy radical.

Figure 8:
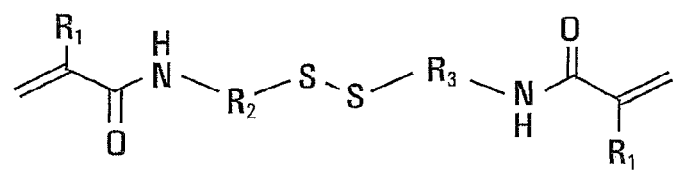
Figure 9:
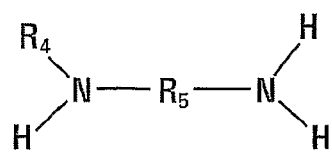

In a specific embodiment, hyperbranched biodegradable poly(amido amine) is prepared via the Michael addition as schematically illustrated at the top portion of FIG. 5 by reacting a bisacrylamide monomer containing a disulfide linkage, as schematically depicted in FIG. 8, and a diamine monomer that contains one secondary amino group and one primary amino group monomer as schematically depicted in FIG. 9, at a molar ratio of 2:1. In some embodiments, each $R_i$ (i=1 to 5) in the diamine monomer and the bisacrylamide monomer should be less nucleophilic than the secondary and primary amino groups of the diamine, so that the $R_i$ groups will not compete with the amino groups for reaction with the vinyl groups in the bisacrylamide monomer.

Figure 10:
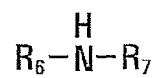

As further illustrated at the middle portion of FIG. 5, poly (amido amine) is next reacted with the amino-functionalized reagent schematically depicted in FIG. 10, to form terminal-capping groups on the branched polymer, which in turn form the shell in the core-shell structure.

Suitable amino-functionalized reagents may include 3-amino-1,2-propanediol, N-Methyl-D-Glucamine, α-aminoethyl ω-methoxy poly(ethylene glycol), α-aminoethyl ω-methoxy poly(propylene glycol), α-aminoethyl poly(vinyl alcohol), chitin, or chitosan.

Suitable bisacrylamide monomers, diamine monomers, and amino-functionalized reagents are currently available from commercial providers.

The terminal-capping reaction may be carried out over a wide range of temperatures and pressures. Reaction at lower temperatures, however, may require a longer reaction time. For example, the terminal-capping reaction may be carried out at a temperature between about −20° C. and about 150°C.

Other terminal capping groups or segments may be used for forming the shell groups. The shell groups, such as hydrophilic shell groups, may be selected to prevent undesired aggregation of molecules in the reaction solution, so that the branched molecules and crosslinked molecules will have sufficient hydrophilicity to form a hydrogel matrix through crosslinking by disulfide bonds before they precipitate due to aggregation.

The precursor may be prepared in the presence of a solvent. Suitable solvents may include water, methanol, ethanol, 2-propanol, 1-butanol, dimethylsulfoxide (DMSO), dimethylformamide (DMF), dimethylacetamide (DMA), chloroform, dichloromethane, methyl chloride, tetrahydrofuran, toluene, benzene, or carbon tetrachloride.

The hyperbranched poly(amido amine) may be used directly to form the hydrogel, or may be further purified prior to use. Purification can be achieved with any suitable technique, including precipitation, crystallization, chromatography, drying under vacuum, or the like. For example, poly (amido amine) may be first purified by precipitation with ether, washed with fresh ether, and then dried under vacuum.

The hyperbranched polymers so prepared may be hydrophilic, hydrophobic, or amphiphilic, depending on the hydrophilicity/hydrophobicity of the bisacrylamide monomer, diamine monomer, and terminal-capping groups used in the particular application.

The hydrogel prepared from branched molecules may be readily degradable such as when attacked by an enzyme. When non-toxic monomers and non-toxic amino-functionalized agents/groups are used as the starting materials for preparing poly(amido amine), the precursor molecules, the hydrogel, and the products and by-products of the degradation reaction may also be non-toxic.

The bioactive agent to be incorporated in the hydrogel may be a therapeutic, diagnostic, or prophylactic agent. The agent may be, for example, a small molecule, organometallic compound, nucleic acid, protein, peptide, polynucleotide metal, isotopically labelled chemical compound, drug, vaccine, immunological agent, or the like. The agent may be a single entity or compound, or a combination of different entities or compounds.

In one embodiment, the bioactive agent is a compound with pharmaceutical activity, such as a clinically useful drug. Suitable drugs may include antibiotic, anti-viral agent, anesthetic, steroidal agent, anti-inflammatory agent, anti-neoplastic agent, antigen, vaccine, antibody, decongestant, antihypertensive, sedative, birth control agent, progestational agent, anti-cholinergic, analgesic, anti-depressant, anti-psychotic, diuretic, cardiovascular active agent, vasoactive agent, non-steroidal anti-inflammatory agent, nutritional agent, or the like.

The agents may be in the form of nanoparticles, such as DNA, RNA, and DNA nanoparticles.

Suitable therapeutic agents may include peptides, proteins such as human recombinant proteins, small molecules, genes, antigens, antibodies and fragments thereof, analgesics, anesthetics, anti-arthritic drugs, disease modifying anti-rheumatic drugs, anti-asthma drugs, anti-coagulants, anticonvulsants, antidepressants, antidiabetics, antineoplastics, antipsychotics, antihypertensives, antibiotics, antihistamines, decongestants, anti-inflammatories, muscle relaxants, anti-parasitic drugs, antiviral drugs, anti-restenotic agents, anti-spasm agents, chondroprotective agents, vasorelaxants, vasoconstrictors and immunosupressants.

The bioactive agent may also be an agent for use in diagnosis or screening. Diagnostic agents that can be delivered in vivo may include gases, metals, commercially available imaging agents used in positron emission tomography (PET), computer assisted tomography (CAT), x-ray, fluoroscopy, and magnetic resonance imaging (MRI), and contrast agents. Examples of suitable materials for use as contrast agents in MRI include gadolinium chelates, iron, magnesium, manganese, copper, chromium, and their chelates. Examples of materials useful for CAT and x-ray imaging include iodine-based materials.

Prophylactic agents may include antibiotics, nutritional supplements, and vaccines. Vaccines may include isolated proteins or peptides, inactivated organisms or viruses, dead organisms or viruses, genetically altered organisms or viruses, and cell extracts.

In one embodiment, the bioactive agent may be a polynucleotide. A polynucleotide may be any nucleic acid, and may include RNA and DNA. The polynucleotides may be of any size and sequence, and may be single or double stranded. The polynucleotide may, for example, be greater than 1000 base pairs long or even greater than 10,000 base pairs long. The polynucleotide may be purified prior to use and may be substantially free from contaminants. The polynucleotide may be more than about 50% pure, more than about 75% pure, or more than about 95% pure. The polynucleotide may be engineered using recombinant techniques. Alternatively or in addition, the polynucleotide may be obtained from natural sources and purified from contaminating components found normally in nature. The polynucleotide may be chemically synthesized in a laboratory. For example, the polynucleotide may be synthesized using standard solid phase chemistry. The polynucleotide may be modified by chemical or biological means, for example to increase stability of the polynucleotide. Methods for modification of polynucleotides include methylation, phosphorylation, end-capping, or the like. Derivatives of polynucleotides may also be used. These derivatives may include modification in the bases, sugars, or the phosphate linkage of the polynucleotide.

The hydrogel may be used in a drug delivery system. The system may include a hydrogel as described herein and a therapeutically effective amount of at least one therapeutic agent in the hydrogel. The system may further include a pharmaceutically acceptable aqueous base. The system may provide sustained release of the therapeutic agent for a period of, e.g., at least one or two weeks following initiation of drug release. The hydrogel in the system may be soft, swelling, and loose; or hard, shrunk, and compact.

The hydrogel may be applied to an implantable device. The implantable device may include stents, catheters, airway tubes, conduits, screws, plates, shunts, artificial joints, artificial hearts, artificial valves, prostheses, or the like.

The following examples are offered by way of illustration and not by way of limitation.

EXAMPLES

The materials used in these Examples were obtained as described below unless otherwise indicated. 1-(2-aminoethyl)piperazine (AEPZ), N,N'-bis(acryloyl)cystamine (BAC), and α-hydroxy-ω-methoxy-PEG (750 g/mol) were purchased from Aldrich™ (Milwaukee, Wis., USA) and used without further purification. α-amino-ω-methoxy-PEG ($M_n$=750) was prepared from α-hydroxy-ω-methoxy-PEGs (750 g/mol) according to the procedure described in P. Mongondry et al., *Macromol. Rapid Commun.*, 2003, vol. 24, p. 681. All other materials, including solvents, were used as received from Aldrich or Tedia (solvent) without further purification.

The material characterizations were performed as follows. The NMR spectra were obtained on a Bruker DRX-400 spectrometer with $CDCl_3$ and $D_2O$ as solvent. A Brookhaven™ BI-9000AT digital autocorrelator was used for dynamic light scattering (DLS) measurements. The scattering angle was fixed at 90° for measuring hydrodynamic radius ($R_h$). $R_h$ and polydispersity (PDI), i.e., $<\mu 2>/\Gamma^2$ were obtained using a cumulant analysis. Molecular weight was determined based on Dynamic Light Scattering measurement of the sample, by determining dn/dc from sample concentration and optical 'contrast' of the material. High performance liquid chromatography (HPLC) was performed by Waters 2695 Separation Module using a Waters 2996 PDA Detector or a fixed wavelength UV detector, with Millennium processing software version 3.2. UV—vis spectra were obtained on a Shimadzu™ 2501PC spectrometer at room temperature. The reference samples were pure deionized water or 1×PBS buffer. Fourier Transform infrared spectroscopy (FT-IR) spectra of the polymer and hydrogels were recorded on a Bio-Rad 165 FT-IR spectrophotometer; 64 scans were signal-averaged with a resolution of 2 cm$^{-1}$ at room temperature. Field emission scanning electron microscopy (SEM) images were obtained at acceleration voltage of 5 kV on a JSM-6700F microscope (JEOL, Japan). The samples were sputter-coated with a thin layer of gold fro 15 s to make the sample conductive before testing.

Example 1

Synthesis and Characterization of Hyperbranched poly(amido amine) poly(BAC2-AEPZ1)-PEG AEPZ (1.5 mmol) was dissolved in 10 mL of methanol at room temperature. BAC (3.0 mmol) was added dropwise to the solution while stirring, followed by rinsing with 2 mL of methanol. The mixture was stirred at 50° C. for about 6 days. 2.3 mmol of α-amino-ω-methoxy-PEG ($M_n$=750) was added and kept stirring at 60° C. for one week to seal terminal vinyl groups. The product was precipitated from the reaction using 200 mL of diethyl ether under vigorously stirring. The polymer was collected and purified by reprecipitation from a methanol solution into 100 mL of acetone containing 5 mL of 37% concentration HCl followed by being dried under vacuum at 50° C. for 24 hours.

A water-soluble poly(amido amine) was obtained having an absolute molecular weight of 27000 g/mol as determined by DLS.

Figure 11:
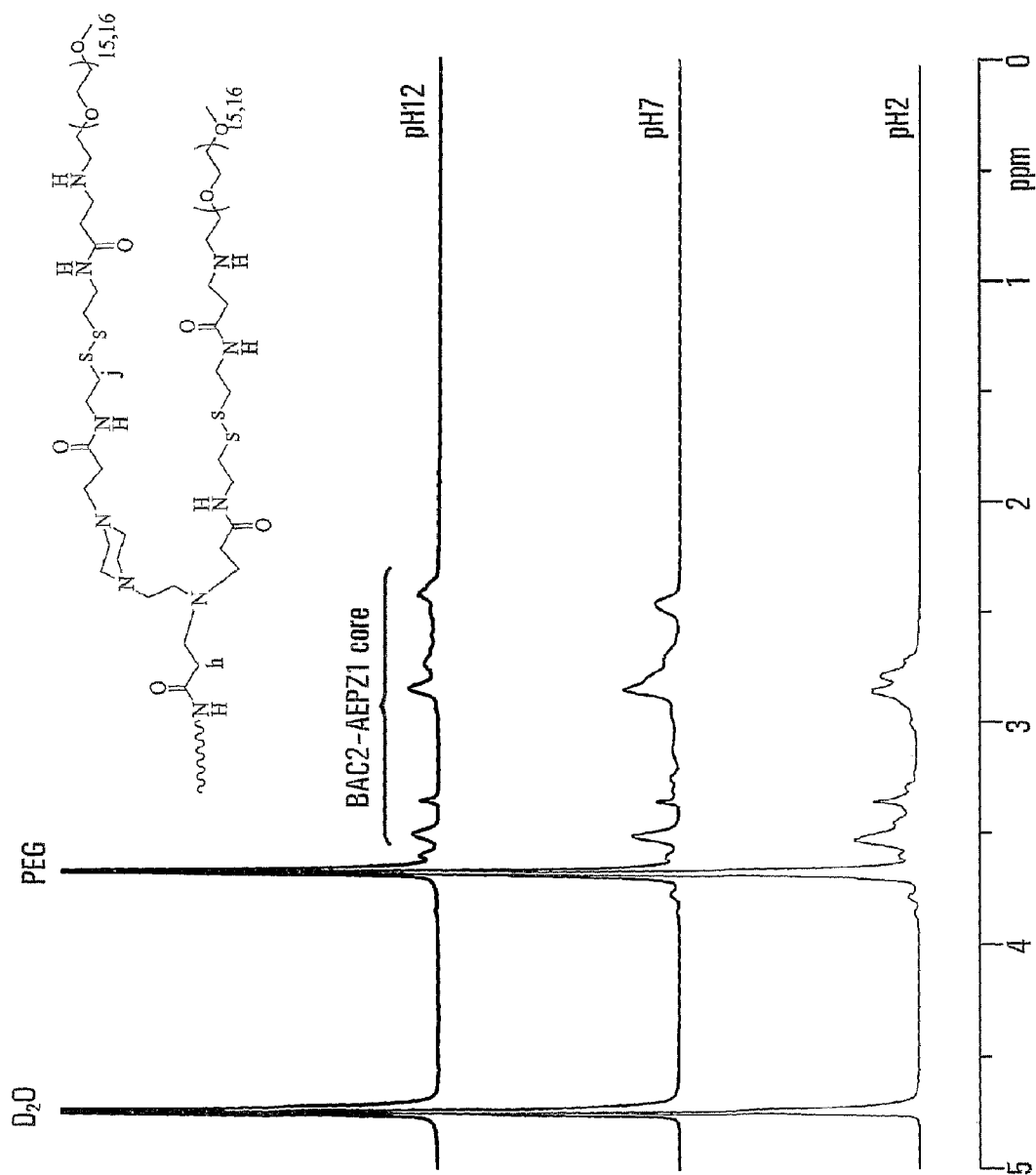
FIG. 11 is a line diagram showing $^1$H-NMR spectra detected from a sample in solutions with different pH.
Figure 12:
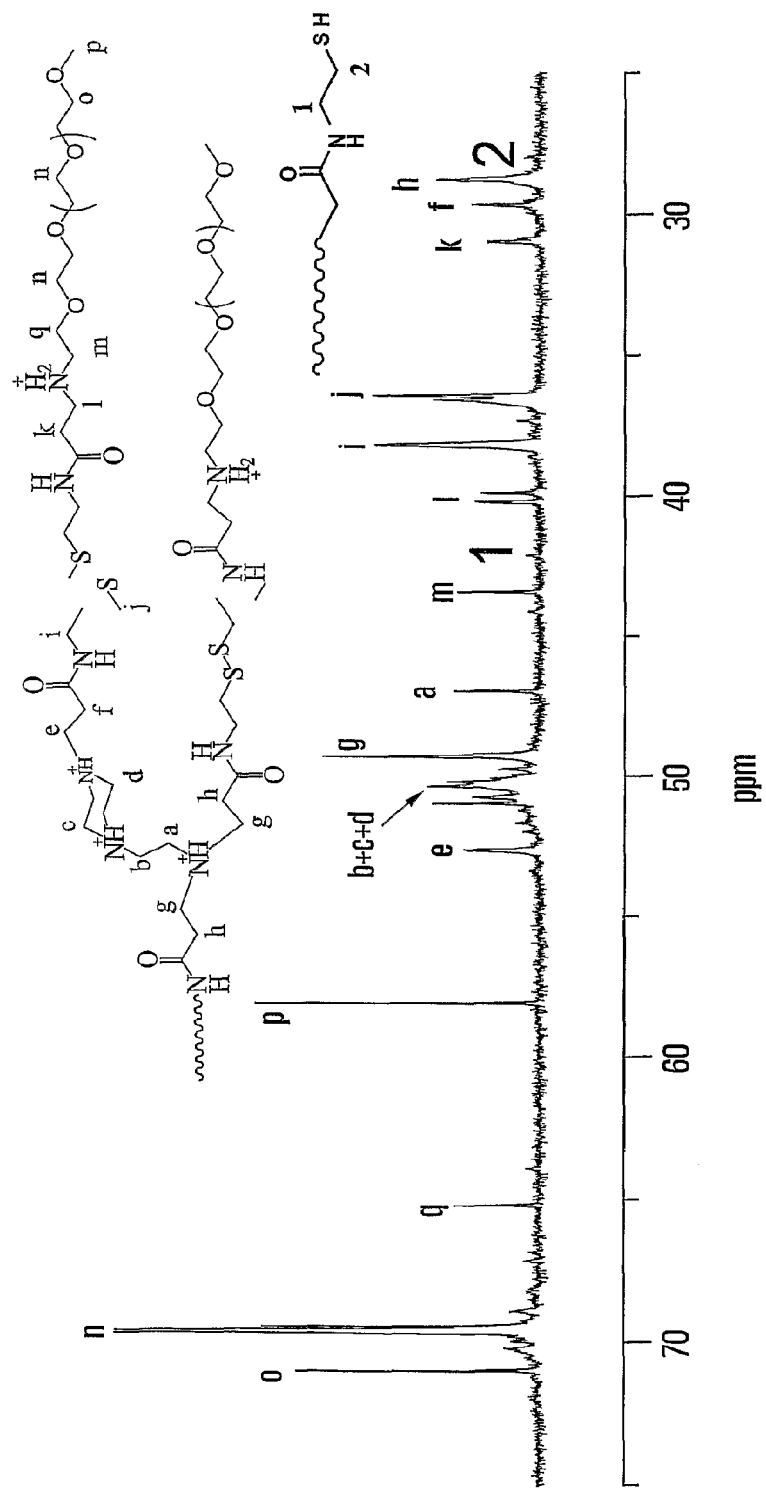
FIG. 12 is a line diagram showing a $^{13}$C-NMR spectrum of a sample.

The hyperbranched poly(amido amine) samples as prepared were responsive and sensitive to changes in pH in their environment. For example, the $^1$H NMR spectra of a representative sample in solutions of different pH (=2, 7 or 12) are shown in FIG. 11. As can be seen, the locations of the peaks representing the amino group shifts with change in pH. This indicates protonation of the amino groups and downfield shift of protons adjacent to the amines in poly(BAC2-AEPZ1) core. The $^{13}$C NMR spectrum of the protonated sample in D$_2$O, shown in FIG. 12, further confirmed the structure of the sample polymer. The spectral peaks identified as 1" and "2" in FIG. 12 are associated with thiol groups which were formed from reduction of disulfide bonds during the preparation and purification procedures.

Example 2

Cytotoxicity Assay of poly(amido amine) poly(BAC2-AEPZ1)-PEG

BHK21, HEK293 and L929 cells were cultured in DMEM supplemented with 10% FCS at 37° C., 10% CO$_2$, and 95% relative humidity. For the cell viability assay, polymer solutions were prepared in serum supplemented tissue culture medium. pH and osmolarity of the preparations were routinely measured and adjusted to pH 7.4 and 280-320 mosm/kg. The cells (10,000 cells/well) were seeded into 96-well microtiter plates (Nunc, Wiesbaden, Germany). After overnight incubation, the culture medium was replaced with 100 μL serial dilutions of the polymers, and the cells were incubated for another 12 hours. Then medium with polymer extraction was aspirated and replaced by 100 μL. DMEM without serum to minimize the change of aggregate formation between the charged sites of proteins and polymer before adding MTT assays. 20 μL sterile filtered MTT (3-(4,5-dimethyl-thiazol-2-yl)-2,5-diphenyl tetrazolium bromide) (5 mg/ml) stock solution in phosphate buffered saline (PBS) was added to each well. After 4 hours, unreacted dye was removed by aspiration. The formazan crystals were dissolved in 100 μL/well DMSO (BDH laboratory Supplies, England) and measured spectrophotometrically in an ELISA reader (Model 550, Bio-Rad) at a wavelength of 570 nm. The spectrophotometer was calibrated to zero absorbance using culture medium without cells. The relative cell growth (%) related to control cells containing cell culture medium without polymer was calculated by $[A]_{test}/[A]_{control}\times100\%$. All the transfection tests were performed in triplicate.

Figure 13:
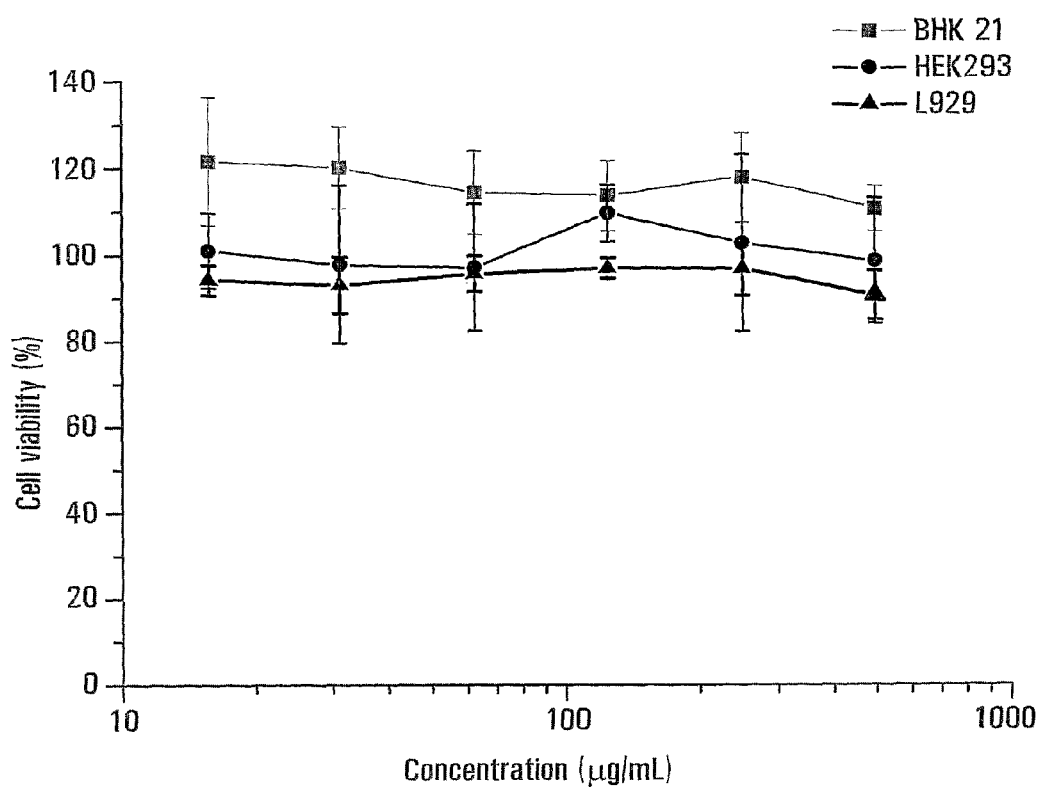
FIG. 13 is a line diagram showing measured cell viability in sample hydrogels prepared according an embodiment of the present invention.

The cytotoxicity tests conducted with three different cell lines in the samples showed that the sample polymer of Example 1 had low toxicity. See FIG. 13, which shows the cell viability in percentage at different cell concentrations when BHK21, HEK293 and L929 cells were respectively dispersed in the protonated sample polymer.

Thus, the sample polymer may be biocompatible, and may be suitable for use as a vector for delivering bioactive agents to cells and tissues in vivo and in vitro.

Example 3

Preparation of Loose and Compact Hydrogels 0.1 g of poly(BAC2-AEPZ1)-PEG was dissolved in 830 μL of deionized water and 70 μL of 5M NaOH was added to adjust pH to more than 12. At room temperature, the sample solution slowly became milky and turbid. After about one hour, the sample solution turned into a loose hydrogel. The water in the solution was completely absorbed by the sample hydrogel by this time.

Different samples were prepared according to the above procedure.

In some cases, the solution and hydrogel were neutralized by adding 70 μL of 5M HCl about one hour after addition of NaOH. The loose hydrogel samples were found to remain stable for an extended period of time (more than six months) after neutralization.

In some cases, the solution was not neutralized. In these cases, the initially loose hydrogel samples further shrunk and formed compact hydrogels. Hard hydrogels were formed after one day of aging in basic solution. No significant further compaction or hardening was observed after one or two days.

Some neutralized loose hydrogel samples were also further shrunk to form compact hydrogels by re-basification.

Figure 14A:
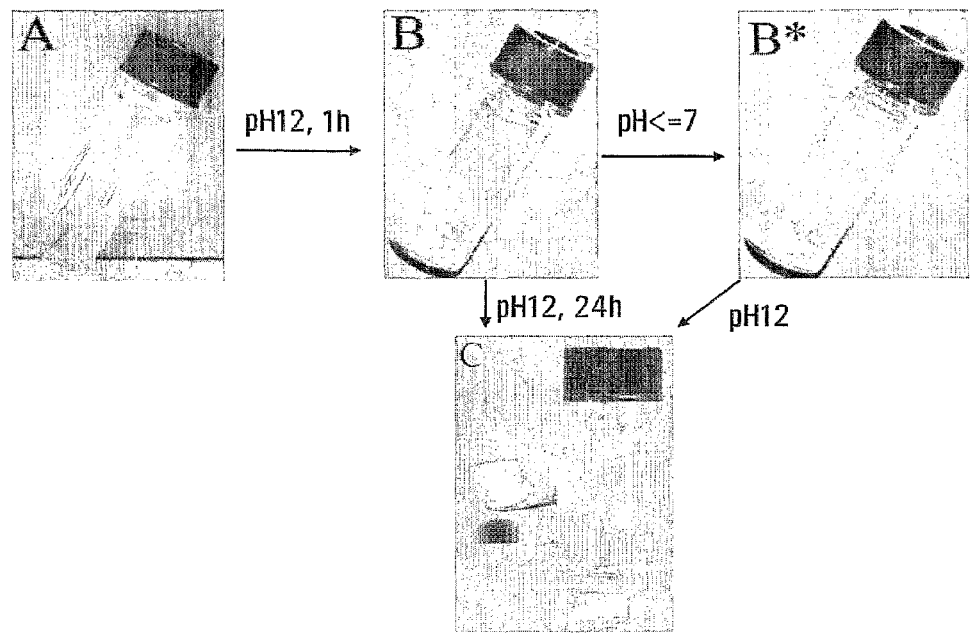
FIG. 14A are images of sample solutions and hydrogels at different pH.

FIG. 14A shows the images of a representative sample solution at different pH. The sample solution initially (as shown in image "A" in FIG. 14A) had 10 wt % of the sample polymer, poly(BAC2-AEPZ1)-PEG. The image "A" of FIG. 14A was taken before the pH in the sample solution was increased. The image "B" in FIG. 14A was taken after the pH had been increased to about 12 for one hour, which shows a loose hydrogel formed in the solution. The image in "B*" in FIG. 14A was taken after the pH had been reduced to below about 7. The loose hydrogel was found to remain stable after the solution had been neutralized. The image "C" in FIG. 14A shows both a hydrogel sample formed after 24 hours in a pH 12 solution (the white cylindrical sample outside the bottle) and a hydrogel sample formed from the sample shown in image "B*" of FIG. 14A after the pH in the solution was re-increased to 12 (the sample inside the bottle). Both sample hydrogels shown in image "C" of FIG. 14A were compact.

Figure 14B:
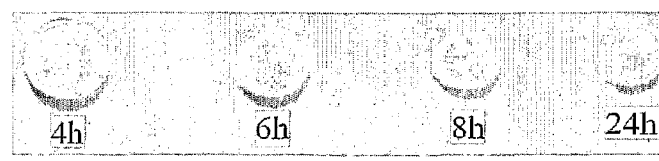
FIG. 14B are images of sample hydrogels after different periods of crosslinking.

FIG. 14B shows images of a sample hydrogel after different periods of crosslinking in the basic solution. As can be seen, the size (diameter) of the hydrogel shrunk overtime, indicating gradual compaction of the hydrogel matrix.

Figure 15:
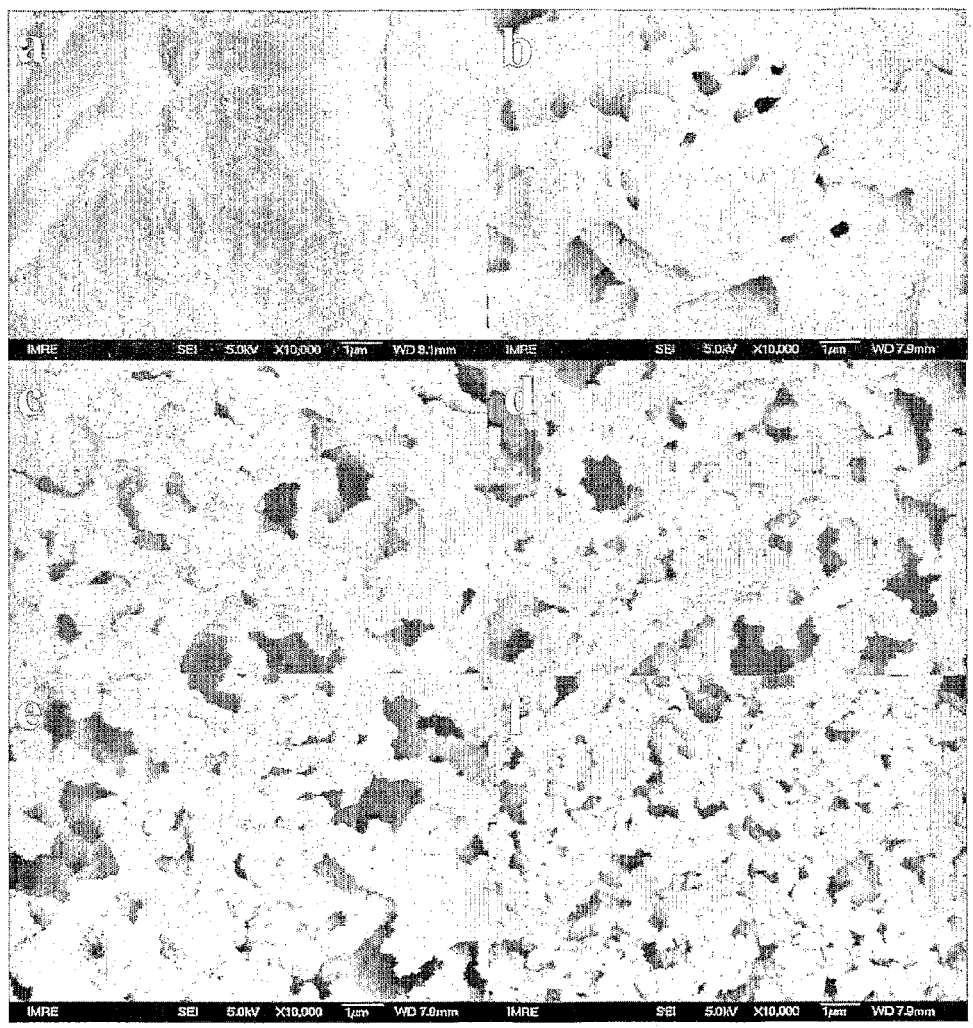
FIG. 15 shows scattering electron microscopy (SEM) images of sample hydrogels obtained after different crosslinking time.

FIG. 15 shows SEM images taken from a sample hydrogel at different times after the pH in the sample solution had been increased to about 12. Image "a" in FIG. 15 was taken after one hour, image "b" in FIG. 15 was taken after 2 hours, image "c" in FIG. 15 was taken after 4 hours, image "d" in FIG. 15 was taken after 6 hours, and image "e" in FIG. 15 was taken after 8 hours, and image "f" in FIG. 15 was taken after 24 hours.

The observed changes in hydrogel size and morphology in an alkaline environment confirmed that the compactness of the hdyrogel can be controlled by adjusting the crosslinking time (the time period in which the polymer/hydrogel is in the high pH environment).

The hydrophilicity of the prepared samples varied depending on the particular materials used. For example, the sample hydrogel was found soluble and stable in aqueous solution.

The sample hydrogel was readily degraded in an aqueous solution containing glutathione (enzyme), which was expected to cause break down of the disulfide linkages in the polymer.

A sample hydrogel decomposed and completely disintegrated after being immersed in 50 mM DL-Dithiothreitol (DTT) for 8 hours, indicating that the sample hydrogel is biodegradable.

Without being limited to any particular theory, the observed results are consistent with the expectation that the crosslinking of the polymer resulted from thiol-disulfide exchange. Since most thiols have pKa values ranging from 7 to 11 in water, in environments with pH>12, activation of thiolate is expected to facilitate the thiol-disulfide exchange reaction. Some thiol groups, though very small in quantity, could be expected to exist in the poly(BAC2-AEPZ1)-PEG sample, due to reduction in the number of disulfide bonds or introduction from an impure starting material. When the pH of the polymer solution was adjusted to 12 or higher, the thiols were deprotonated to thiolates. The activated thiolate groups would trigger thiol-disulfide exchange reaction, leading to extramolecular reassembling and crosslinking between different hyperbrached polymer macromolecules. At the same time, highly hydrophilic small segments, such as di-or tri-PEG chains, were formed.

Figure 16:
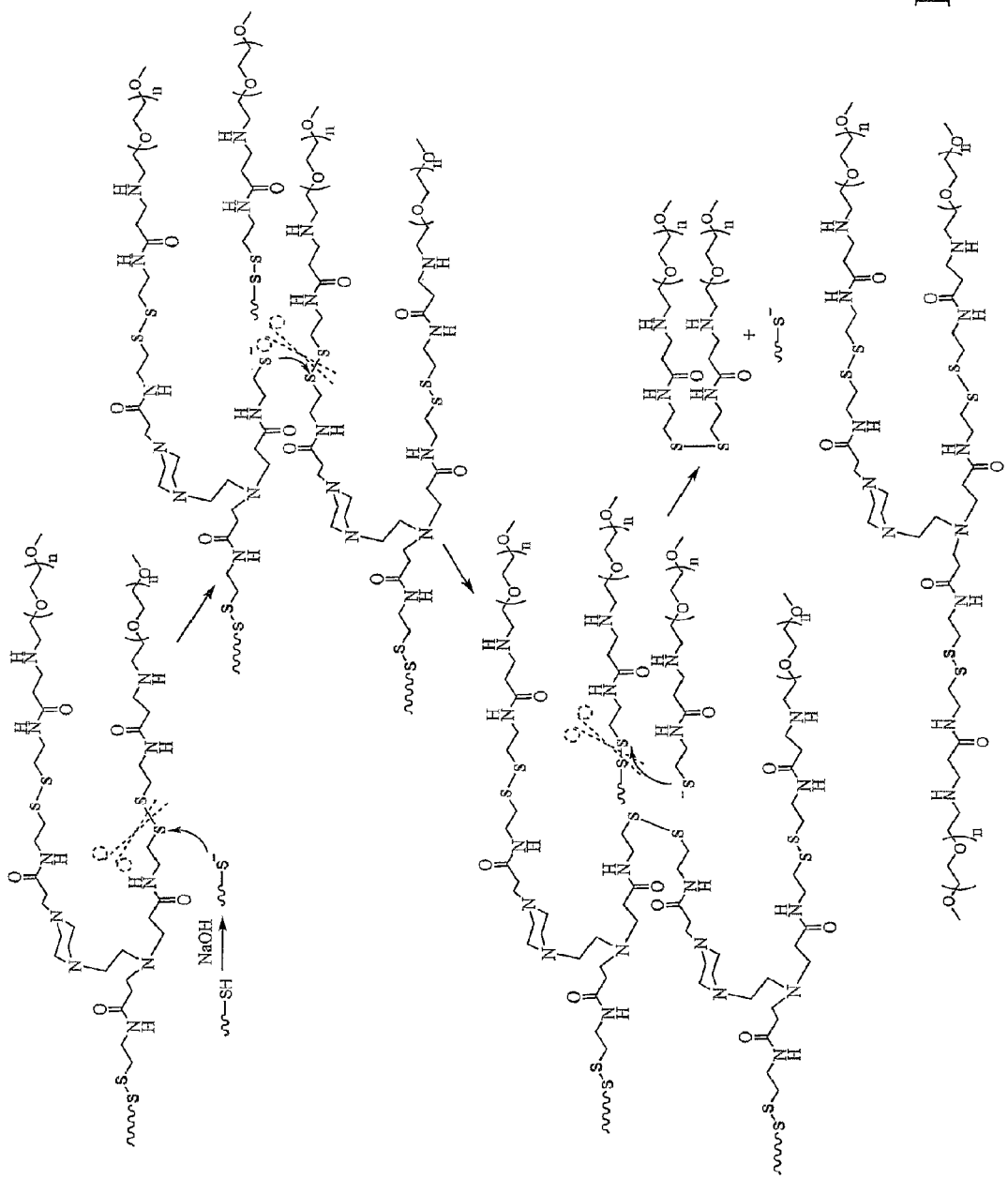
FIG. 16 is a schematic representation of the reagents and products expected to be present in an exemplary sample solution.

Representative expected thiol-disulfide exchange reactions are illustrated in FIG. 16, which also shows possible structures of the reagents and the products after the exchange reaction.

Figure 17:
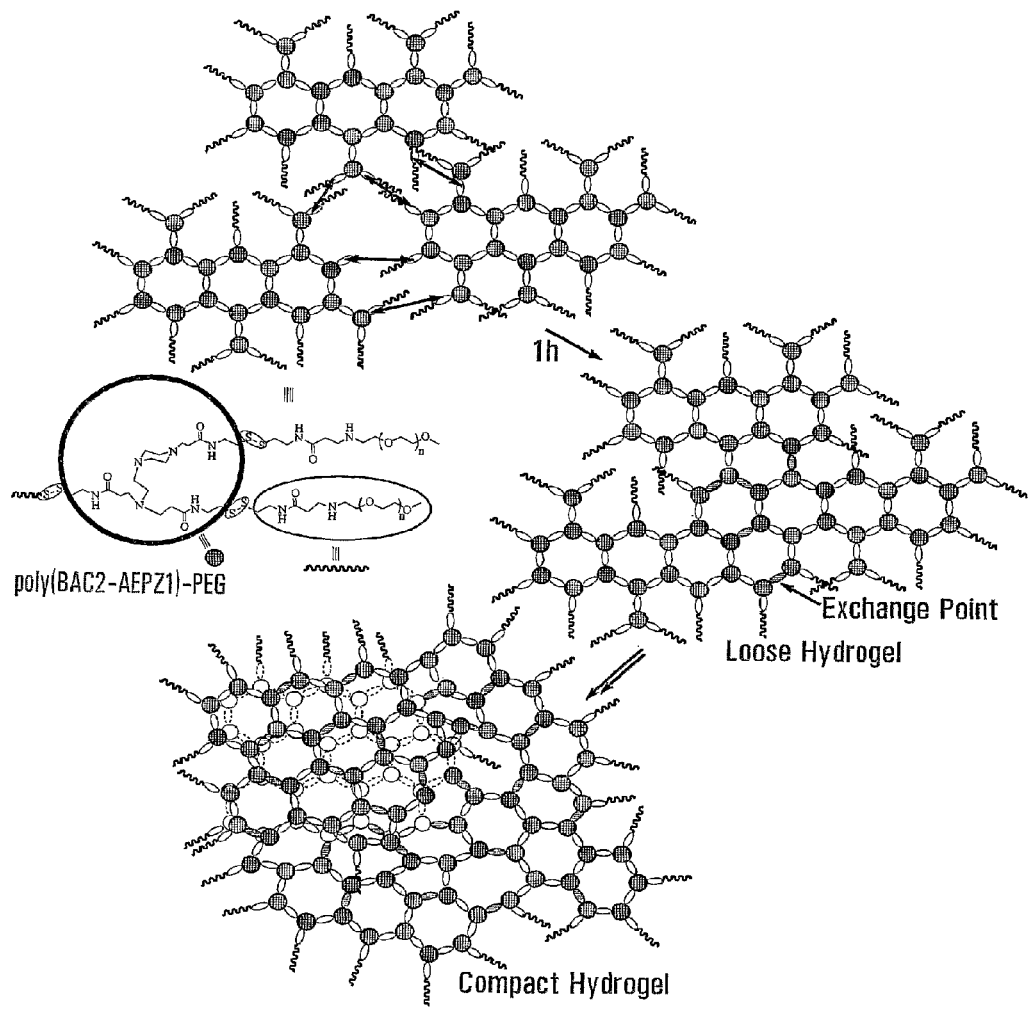
FIG. 17 is a schematic diagram illustrating the possible crosslinking processes in the sample solution.

When hyperbranched poly(BAC2-AEPZ1)-PEG contains a large number of disulfide groups, it can be approximately represented by a hexagonal lattice of polymer cores connected with disulfide bonds and capped by hydrophilic PEG, as illustrated in FIG. 17. As illustrated, disulfide exchange reaction can cause extramolecular crosslinking of the hyperbranched polymer molecules. In particular, a disulfide bond on a terminal branch in a first polymer molecule may undergo thiol-disulfide exchange with a thiolate group on a terminal branch of a second polymer molecule to form a new disulfide bond which crosslinks the two molecules, as illustrated in FIG. 17.

FIG. 17 also illustrates that the degree of crosslinking increases over time before reaching a maximum value. When the total crosslinking time is short, a low degree of crosslinking is achieved, resulting in a loose hydrogel. With increased crosslinking time, the degree of crosslinking is increased, resulting in a further compacted or hardened hydrogel. As water can be expelled from the pores due to more closely packed hydrophobic polymer cores over time, the hydrogel can shrink over time. With less water in the pores, it will become more difficult for the attacking thiolate groups to gain access to the disulfide bonds in the cores. It was observed that, after an extended time period of crosslinking, such as about a day, the cores of the sample polymer became quite hydrophobic and the sample hydrogels became compact and hard. As a result, access to the disulfide bonds in the hydrogel was limited and thiol-disulfide exchange reactions occurred slowly.

The thiol-disulfide exchange reactions were also selectively inhibited by reducing pH in the reaction solution.

It was found that hydrogel samples could be formed from a solution having a polymer concentration as low as 0.5 wt %. This result is consistent with the expectation that the crosslinking was through thiol-disulfide exchange, which does not require the polymer concentration to be above a critical concentration to occur.

It was also found that with 0.5 wt % of polymer in the solution, the water in the solution was not completely absorbed by the resulting hydrogel. With a polymer concentration above about 2 wt %, the water in the initial reaction solution was completely absorbed by the hydrogel.

To further confirm the mechanism for the formation of the sample hydrogels, solid state NMR and FTIR were performed for the protonated poly(BAC2-AEPZ1)-PEG, loose hydrogels (one hour of crosslinking), and compact hydrogels (24 hours of crosslinking). Representative results are shown in FIGS. 18 and 19, respectively.

Figure 18:
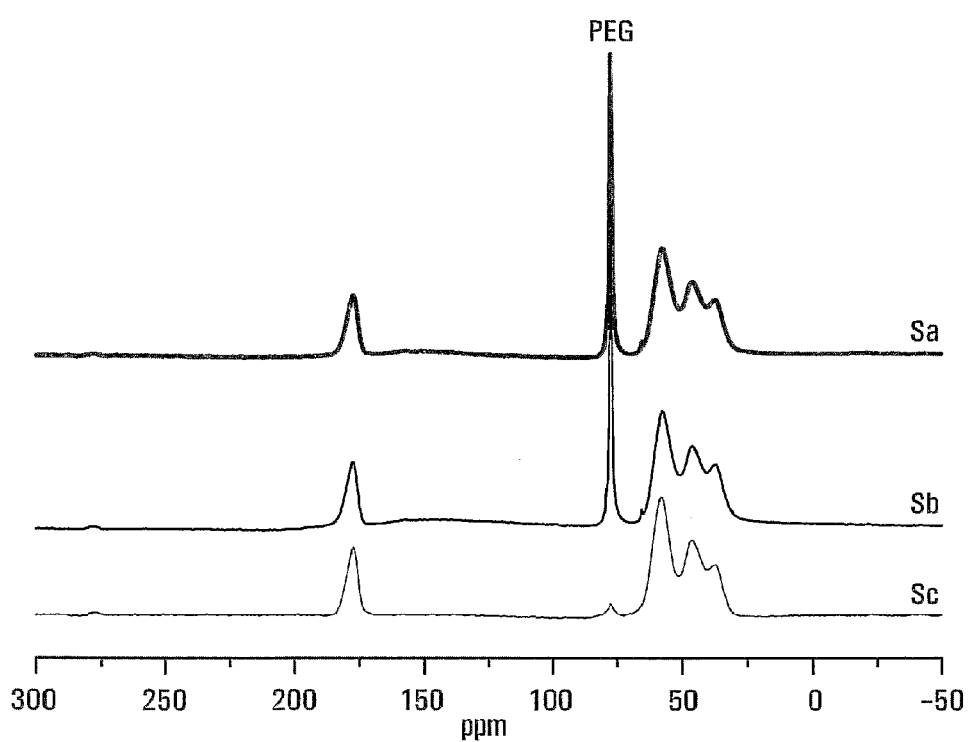
FIG. 18 is a line diagram showing solid state $^{13}$C-NMR spectra of different samples.
Figure 19:
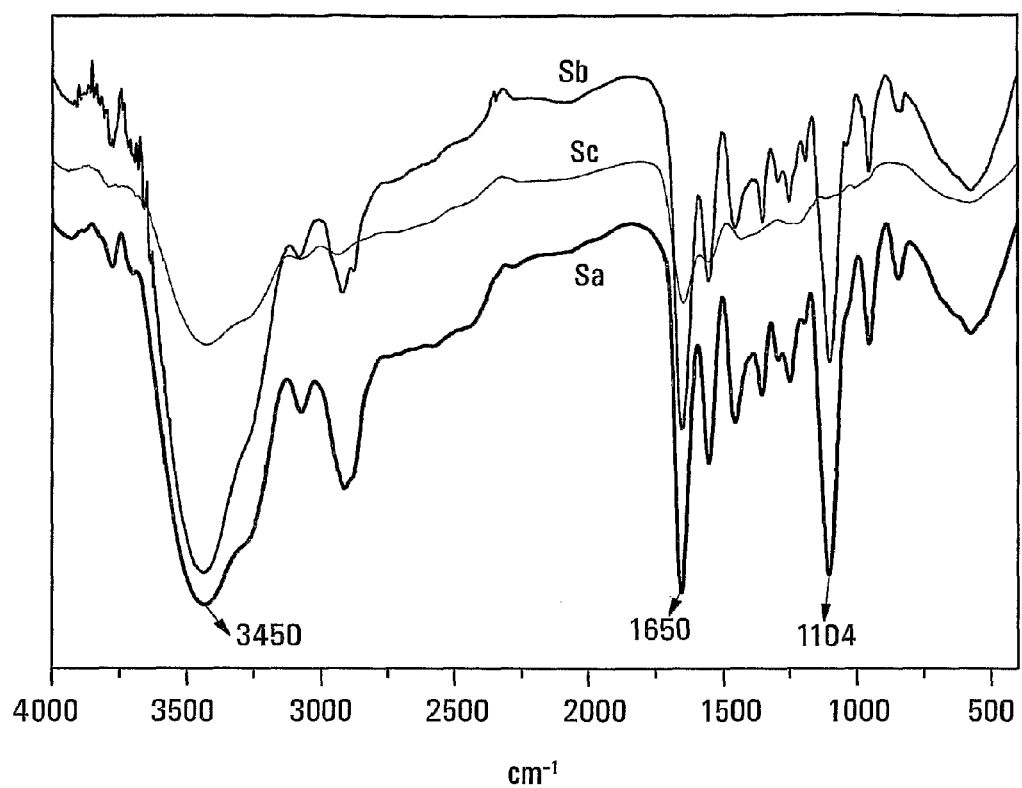
FIG. 19 is a line diagram showing the IR spectra of samples of FIG. 13.

In FIGS. 18 and 19, the spectra labeled as "Sa" were taken from the sample protonated poly(BAC2-AEPZ1)-PEG polymer, the spectra labeled as "Sb" were taken from the loose hydrogel sample (one hour of crosslinking), and the spectra labeled as "Sc" were taken from the compact hydrogel sample (24 hours of crosslinking). The spectra in FIG. 18 do not show any apparent difference between the protonated poly(BAC2-AEPZ1)-PEG polymer and the loose hydrogel sample, but show weak peaks associated with PEG chains for the compact hydrogel sample. Similar results were shown in FIG. 19.

Figure 20:
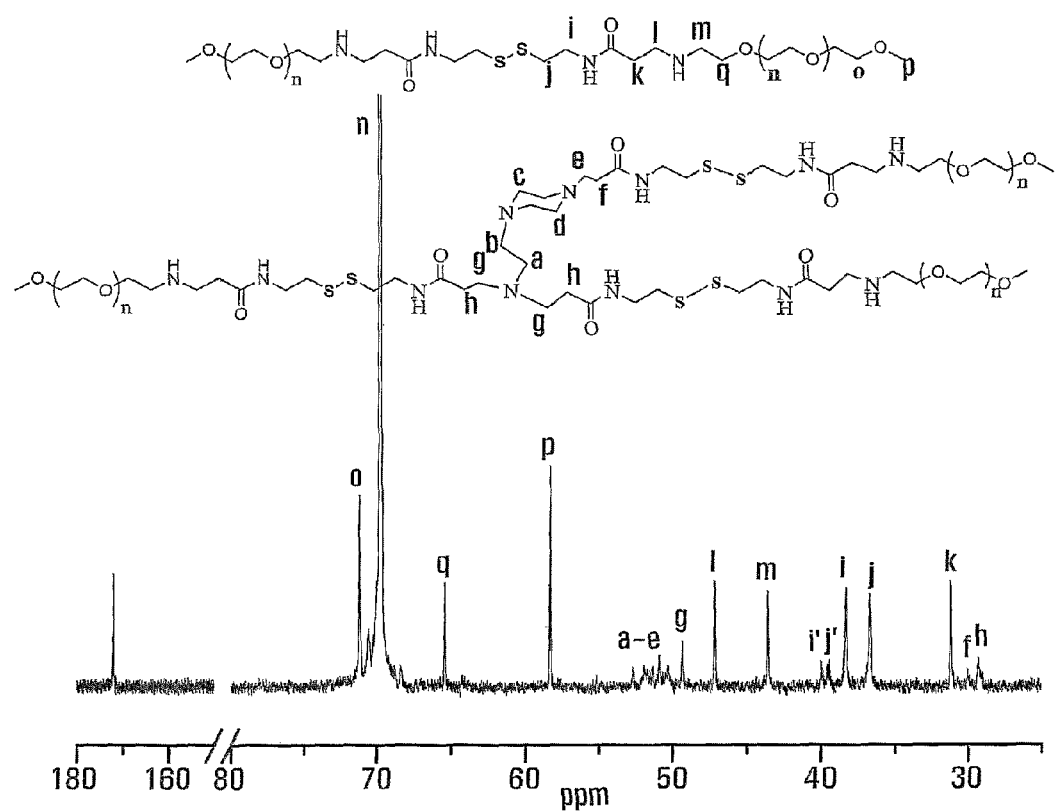
FIG. 20 is a line diagram showing a $^{13}$C-NMR spectrum of a sample.

These results are consistent with crosslinking by thiol-disulfide exchange. In particular, when loose hydrogels were formed, only a small number of PEG groups were dissociated from the polymer and dissolved in water after rinsing. Thus, a slight intensity decrease of —$CH_2$— (2900 cm$^{-1}$) was observed, as shown in FIG. 19 (see spectra "Sa" and "Sb"), and no obvious change was detected from the solid sate NMR spectra. Further disulfide exchange lead to more compact hydrogels (24 h) with more hydrophobic cores, and the aqueous phase consequently contained more hydrophilic di-/tri-PEG compounds dissolved in the water phase. Thus, a greater intensity decrease of PEG peaks was observed, as can be seen from spectra "Sc" in FIGS. 18 and 19. The existence of the di/tri-PEG compounds was further confirmed from the $^{13}$C NMR spectrum shown in FIG. 20, which was obtained from a sample recovered after freeze-drying the sample aqueous solution after the solution had been subject to 8 hours of disulfide exchange reaction. The resulting product was a compact hydrogel.

Example 4

Preparation of doxorubicin-loaded hydrogels

Aqueous solutions of 5 wt % poly(BAC2-AEPZ1)-PEG was prepared and left to equilibrate overnight at room temperature. Appropriate amounts of doxorubicin (Dox) were loaded to make the concentration of Dox in the polymer solution 5 mg mL$^{-1}$. Subsequently, small amount of 5M sodium hydroxide (NaOH) was added in and was being vortexed for a few minutes to adjust pH to more than 12, and the solutions turn blue. Then, the solution was left undisturbed during hydrogel formation for predetermined time. After predetermined time, a slight in excessive of 5M HCl was added to neutralize the hydrogel to keep the hydrogel stable, and the hydrogel turned red. After rinsing the hydrogel by a small amount of water, the Dox-loaded hydrogel was obtained for further use.

Example 5

Doxorubicin In-Vitro Release Study

The Dox-loaded hydrogel prepared in Example 4 was transferred into a dialysis bag (pore size: ~100 μm) and placed in test tube containing 25 mL of phosphate buffered saline (PBS; pH 7.4) or dithiothreitol (DTT) containing PBS solutions (with DTT concentration of 10 μM and 10 mM). The buffer solutions were replaced with fresh ones at predetermined time intervals, and the experiments were done in duplicate. The collected buffer solutions were tested by UV absorption at 492 nm to determine Dox contents. Quantification of Dox was based on a calibration curve, obtained using the Dox standards provided, in the range of 0.1-100 mg L$^{-1}$.

The results were presented in terms of cumulative release as a function of time:

Cumulative amount release (%)=$(M_t/M_\infty)$ where $M_t$ is the amount of Dox released from the hydrogel at time t and $M_\infty$ is the estimate amount of Dox loaded in the hydrogel and was calculated from the weight difference of the initial Dox solution concentration and the remaining Dox solution concentration (combining rinsing water and remaining solution expelled from the hydrogel) after loading.

Figure 21:
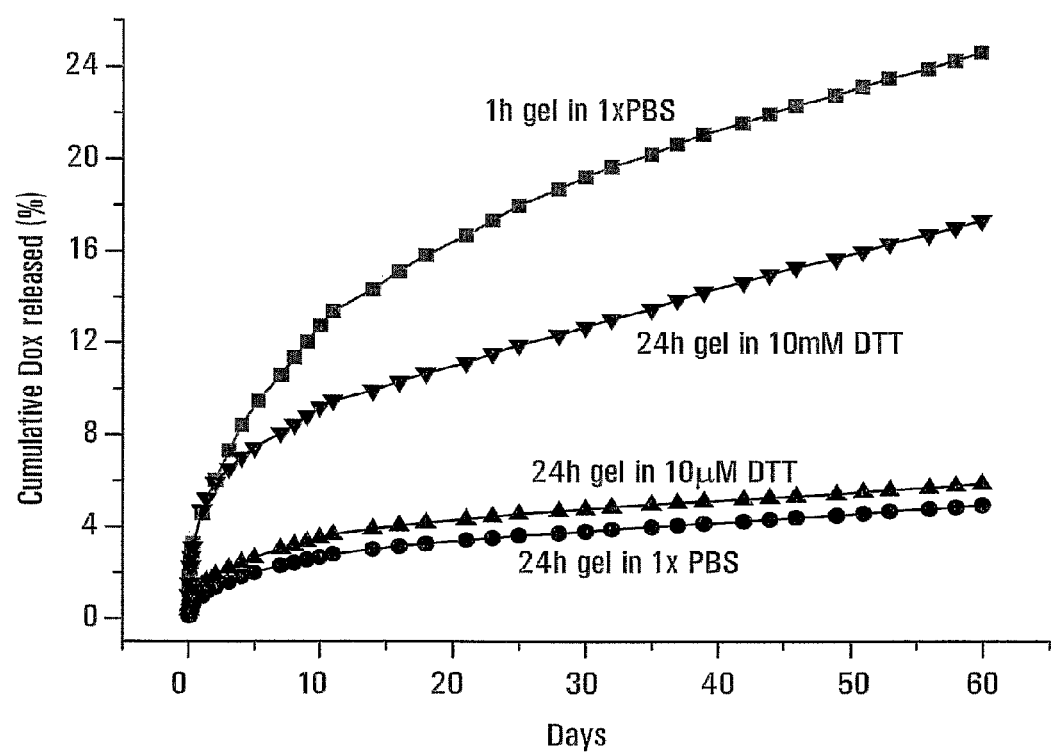
FIG. 21 is a data graph showing the amounts of Doxorubicin (Dox) released from sample hydrogels as a function of time.

FIG. 21 shows representative results, obtained from Dox-loaded sample loose and compact hydrogels at 37° C. in PBS solution or dithiothreitol (DTT) containing PBS solutions (with DTT concentration of 10 μM and 10 mM).

Example 6

Preparation of Paclitaxel (Pac)-loaded Hydrogel 1 mL of Pac/methanol was extracted from saturated stock solution (50 mg/mL) and added to a vial. The vial was left in open air for evaporation of methanol. After completely removing of methanol, 2 mL of polymer solution (containing circa 0.1 g of polymer) was added into the vial. The solution was then being ultra-sonicated for 6 hours. Subsequently, small amount of 5M sodium hydroxide (NaOH) was added in and was being vortexed for a few minutes to adjust pH to more than 12. Then, the solution was left undisturbed during hydrogel formation for a predetermined time. After the predetermined time, a slight in excessive of 5M HCl was added to neutralize the hydrogel to keep the hydrogel stable. Thereafter, remaining solution was extracted and mixed with 1 mL of Dichloromethane (DCM). DCM was then evaporated at room temperature. Next, a 2 mL of a 50:50 (v/v) mixture of acetonitrile and water was added to the dried sample and the solution was placed in an ultrasound bath for 30 minutes. Subsequently, it was purified using a syringe membrane filter with pore size of 0.2 μm and put into a vial for determining amount of unloaded drug using HPLC. The mobile phase for HPLC analysis consisted of a mixture of acetonitrile-water (50:50, v/v), and was delivered at a flow rate of 1 mL/min. A 20 μl aliquot of the sample was injected into a reverse phase SymmetryShield® Column (pore size 5 μm, 150×4.6 mm i.d.). The column effluent was detected UV spectrophotometrically at wavelength of 227 nm. The calibration curve used for the quantification of Pac in the CNTs was linear over the range of 10-620 μg/mL.

Example 7

Paclitaxel In-Vitro Release Study

Figure 22:
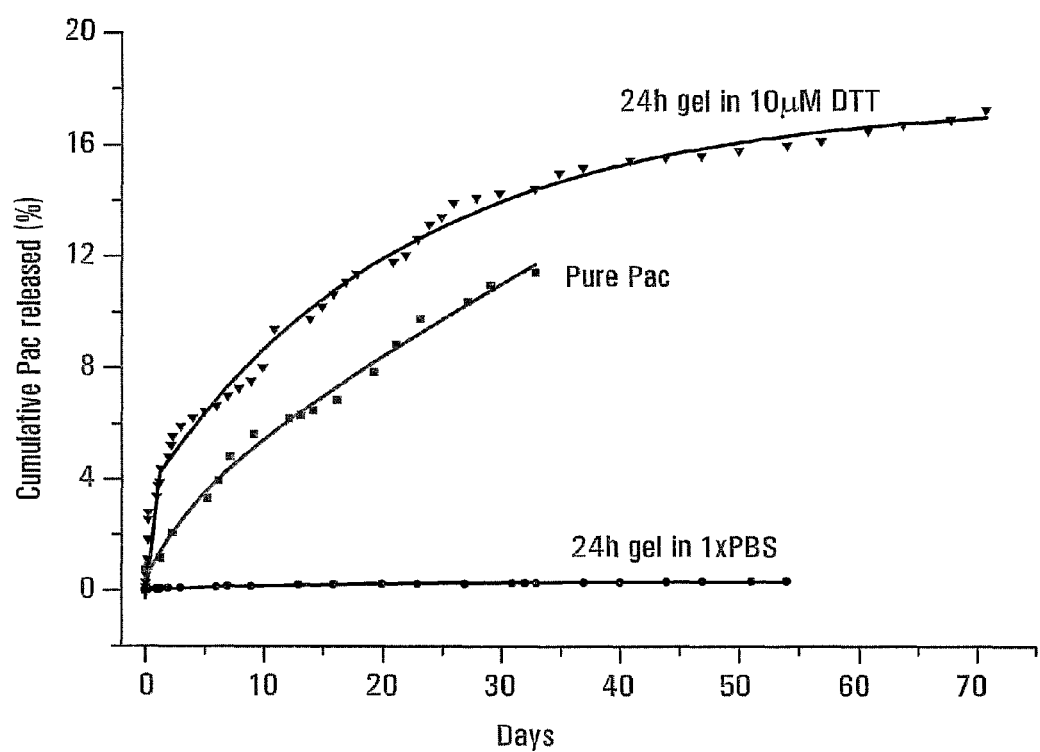
FIG. 22 is a data graph showing the amounts of Paclitaxel (Pac) released from sample hydrogels as a function of time.

Pac-loaded hydrogel prepared in Example 6 was transferred into a dialysis bag (pore size: ~100 μm). After that, the dialysis bag was placed into a conical flask containing 40 mL of phosphate buffered saline (PBS; pH 7.4) or dithiothreitol (DTT) containing PBS solutions (with DTT concentration of 10 mM). The conical flask was kept in 37.4° C. water bath and was being stirred at 100 rpm throughout the release study. Buffer solution was completely drawn from the conical flask at each predetermined time interval and replaced with fresh buffer to maintain sink condition. 4 mL of dichloromethane (DCM) was added to the drawn aliquot in order to extract released Pac. After removal of buffer and evaporation of DCM, the residue was reconstituted in 2 mL of acetonitrile/water (50:50; v/v) and assayed for Pac by HPLC. Cumulative amounts of Pac released from the Pac-loaded hydrogels at 37° C. in PBS or dithiothreitol (DTT) containing PBS solutions (with DTT concentration of 10 mM) as a function of time is shown in FIG. 22. The Pac-loaded hydrogel samples were compact hydrogels formed after 24 hours of crosslinking.

From the test results described in Examples 4 to 7, it was found that the loading capacity of drugs in the sample hydrogel was dependent on the solubility or dispersibility of drug in the aqueous mixed solutions, and the loading capacity was determined to be ca. 5-10% for Dox and 30-50% for Pac.

Dox in vitro release study was performed in different buffer solutions for Dox-loaded loose and compact hydrogels. Phosphate buffered saline (PBS; pH 7.4) or dithiothreitol (DTT) containing PBS solutions (with DTT concentration of 10 μM (similar to extracellular concentration of enzyme, glutathione, in the body) and 10 mM (similar to intracellular concentration of enzyme, glutathione, in the body) were adopted for the investigation of drug release.

As can be appreciated from FIGS. 21 and 22, Dox and Pac were effectively encapsulated in the hydrogel matrix respectively, and the release speed from the compact hydrogels was quite slow. However, increase in DTT concentration facilitated decomposition of the hydrogels, leading to accelerated release of the drug. For example, the cumulative released amount of Dox from a compact Dox-loaded hydrogel was only around 5% after the hydrogel had been immersed in a PBS solution for two months; but the corresponding released amount increased to 17% when 10 mM DTT was added to the PBS solution, as indicated in FIG. 21.

The cumulative Dox release amount from a loose Dox-loaded hydrogel was about 25% after two months in PBS solution. The higher release rate may be due to larger interstices formed within the loose hydrogel matrix, as drug release from the matrix was easier and faster, as compared to drug release from a compact hydrogel matrix.

As Pac was dispersed in the hydrogels as relatively large particles, Pac release was relatively slow. Only 0.35% of loaded Pac was released from the compact hydrogel into PBS solution after 50 days. However, when 10 mM DTT was added to the PBS solution, over 17% of loaded Pac was released after two months, which was slightly higher than pure Pac released in PBS solution.

It can thus be expected that the hydrogels described herein can be used to provide drug delivery systems with effective encapsulation and controlled release rate in different environments.

Embodiments of the present invention also include the use of branched molecules (precursor) comprising disulfide bonds in the process described herein for forming hydrogels.

Embodiments of the present invention also include the use of a solution comprising such branched molecules in the process described herein for forming hydrogels, where the precursor comprises sufficient branches and disulfide bonds such that, when the pH in the solution is adjusted to allow thiol-disulfide exchange between different branches of the branched molecule, the precursor can be crosslinked through disulfide bonds formed in thiol-disulfide exchange reactions to form the hydrogel.

In some embodiments of the present invention, bio-degradable hydrogels may be conveniently produced in situ with selected or desired structures and characteristics, thus allowing more flexibility in the design of the hydrogel or applications involving the hydrogel for various specific applications.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A process for forming a hydrogel, comprising:
   providing, in a solution, a precursor crosslinkable through disulfide bonds for forming said hydrogel, said precursor comprising a branched molecular structure, said branched molecular structure comprising a plurality of branches, at least three of said branches each comprising a disulfide group;
   adjusting a pH in said solution to initiate a thiol-disulfide exchange in said precursor, thus crosslinking said precursor through disulfide bonds formed by said thiol-disulfide exchange; and
   after said precursor is sufficiently crosslinked to form said hydrogel, adjusting the pH in said solution to inhibit a further thiol-disulfide exchange in said hydrogel.

2. The process of claim 1, wherein said adjusting the pH in said solution to initiate said thiol-disulfide exchange in said precursor comprises increasing the pH in said solution to above about 12.

3. The process of claim 1, wherein said adjusting the pH in said solution to inhibit said further thiol-disulfide exchange in said hydrogel comprises decreasing the pH in said solution to below about 8.

4. The process of claim 1, wherein said solution is at a temperature from about −20° C. to about 150° C.

5. The process of claim 1, wherein said solution comprises about 0.1 to about 40% by weight of said precursor.

6. The process of claim 1, wherein said adjusting the pH in said solution comprises adding a base or acid to said solution.

7. The process of claim 1, wherein said thiol-disulfide exchange in said precursor is allowed to occur for about one minute to about three days.

8. The process of claim 1, wherein the pH in said solution is adjusted to inhibit said further thiol-disulfide exchange at a time selected to control a degree of crosslinking in said hydrogel.

9. The process of claim 1, wherein said branched molecular structure comprises a segment that comprises three or four branches branching from a single branching group, each of said three or four branches comprising a disulfide group.

10. The process of claim 9, wherein said branching group comprises a carbon, silicon, phosphorus, amine, amonium cation, imine group, methine group, amide group, or phosphite group.

11. The process of claim 1, wherein at least one of said plurality of branches in said branched molecular structure comprises a plurality of linearly linked disulfide bonds.

12. The process of claim 1, wherein said branched molecular structure comprises a plurality of branching points each comprising a branching group bonded to at least three branches.

13. The process of claim 1, wherein said precursor is a hyperbranched polymer.

14. The process of claim 1, wherein said precursor comprises poly(amido amine).

15. The process of claim 1, wherein said precursor comprises N-substituted poly(ethylene glycol) groups and vinyl groups.

16. The process of claim 15, wherein the molar ratio of vinyl groups to N-substituted poly(ethylene glycol) groups in said precursor is from about 1:1.1 to about 1:4.

17. The process of claim 1, wherein said branched molecular structure has a molecular weight from about 500 g/mol to about 600,000 g/mol.

18. The process of claim 1, wherein said branched molecular structure comprises a hydrophobic poly(amido amine) core and an amino-functionalized hydrophilic shell.

19. The process of claim 1, wherein said solution comprises a releasable agent so that said releasable agent is in said hydrogel when said hydrogel is formed.

20. The process of claim 19, wherein said releasable agent is a bioactive agent.

21. The process of claim 1, wherein said precursor comprises differently structured branched molecules, said differently structured branched molecules crosslinkable to one another through disulfide bonds.

22. The process of claim 1, wherein at least one of said disulfide bonds formed by said thiol-disulfide exchange links branches of a single molecule of said precursor.

23. The process of claim 1, wherein at least one of said disulfide bonds formed by said thiol-disulfide exchange links branches of different molecules of said precursor.

24. The process of claim 1, wherein each one of said plurality of branches in said branched molecular structure comprises a disulfide group.

* * * * *